United States Patent
Dorgan et al.

(10) Patent No.: US 8,993,705 B2
(45) Date of Patent: Mar. 31, 2015

(54) POLYLACTIDE-GRAFT-LIGNIN BLENDS AND COPOLYMERS

(71) Applicants: John R. Dorgan, Golden, CO (US); Michael Paul Eyser, Denver, CO (US); Clay Perbix, Golden, CO (US)

(72) Inventors: John R. Dorgan, Golden, CO (US); Michael Paul Eyser, Denver, CO (US); Clay Perbix, Golden, CO (US)

( * ) Notice: Subject to any disclaimer, the term of this patent is extended or adjusted under 35 U.S.C. 154(b) by 71 days.

(21) Appl. No.: 13/850,447

(22) Filed: Mar. 26, 2013

(65) Prior Publication Data

US 2013/0281582 A1    Oct. 24, 2013

Related U.S. Application Data

(60) Provisional application No. 61/615,689, filed on Mar. 26, 2012.

(51) Int. Cl.
| | | |
|---|---|---|
| *C08G 63/00* | (2006.01) | |
| *C08L 97/00* | (2006.01) | |
| *C08G 63/91* | (2006.01) | |
| *C08H 7/00* | (2011.01) | |
| *C08L 67/04* | (2006.01) | |

(52) U.S. Cl.
CPC .............. *C08G 63/00* (2013.01); *C08G 63/912* (2013.01); *C08H 6/00* (2013.01); *C08L 67/04* (2013.01); *C08L 97/005* (2013.01)
USPC ....................................................... 527/400

(58) Field of Classification Search
USPC ....................................................... 527/400
See application file for complete search history.

(56) References Cited

U.S. PATENT DOCUMENTS

| 7,649,086 | B2 | 1/2010 | Belanger et al. | |
|---|---|---|---|---|
| 7,682,548 | B2 * | 3/2010 | Nishida et al. | ........... 264/328.18 |
| 8,053,566 | B2 | 11/2011 | Belanger et al. | |
| 2009/0062516 | A1 | 3/2009 | Belanger et al. | |
| 2009/0118452 | A1 | 5/2009 | Seppala | |
| 2010/0152428 | A1 * | 6/2010 | Gifford et al. | ................ 530/504 |
| 2012/0071591 | A1 * | 3/2012 | Mohanty et al. | ................ 524/13 |
| 2013/0029406 | A1 | 1/2013 | Dottori et al. | |
| 2014/0066608 | A1 | 3/2014 | Dorgan et al. | |

FOREIGN PATENT DOCUMENTS

GB        992114        5/1965

OTHER PUBLICATIONS

Li et al. Thermal and mechanical properties of biodegradable blends of poly(L-lactic acid) and lignin. Polym Int 52:949-955 (2003).*
"Chemicals used for pH Adjustment," Digital Analysis Corp., Jan. 8, 2010, [retrieved on Jul. 11, 2014], 2 pages. Retrieved from: http://web.archive.org/web/20100108055102/http://www.phadjustment.com/NeutralizationChemicals.htm.
"Table of Acids with Ka and pKa Values," 2009, [retrieved on Jul. 7, 2014], 2 pages. Retrieved from: http://clas.sa.ucsb.edu/staff/Resource%20Folder/Chem109ABC/Acid,%20Base%20Strength/Table%20of%20Acids%20w%20Kas%20and%20pKas.pdf.

(Continued)

*Primary Examiner* — John Uselding
(74) *Attorney, Agent, or Firm* — Sheridan Ross P.C.

(57) ABSTRACT

The present invention is directed to a PLA-graft-lignin polymers and copolymers and methods of making the same. As the lignocellulosic biorefining industry emerges as a viable fuels technology, the availability of the assortment of lignins will also expand. The use of lignins as a copolymer is one area where lignin may be utilized.

20 Claims, 29 Drawing Sheets

(56) References Cited

OTHER PUBLICATIONS

Alonso et al., "Determination of curing kinetic parameters of lignin—phenol—formaldehyde resol resins by several dynamic differential scanning calorimetry methods," Thermochimica Acta, 2004, vol. 419, Iss. 1-2, pp. 161-167.

Arato et al., "The Lignol Approach to Biorefining of Woody Biomass to Produce Ethanol and Chemicals," Twenty-Sixth Symposium on Biotechnology for Fuels and Chemicals, (Ed. Davison), Humana Press, 2005, pp. 871-882.

çetin et al., "Use of organosolv lignin in phenol-formaldehyde resins for particleboard production: I. Organosolv lignin modified resins," International Journal of Adhesion and Adhesives, 2002, vol. 22, Iss. 6, pp. 477-480.

Doherty et al., "Value-adding to cellulosic ethanol: Lignin polymers," Industrial Crops and Products, 2011, vol. 33, Iss. 2, pp. 259-276.

Dorgan et al., "Fundamental solution and single-chain properties of polylactides," Journal of Polymer Science Part B: Polymer Physics, 2005, vol. 43, Iss. 21, pp. 3100-3111.

Georgopoulos et al., "Thermoplastic polymers reinforced with fibrous agricultural residues," Polymer Degradation and Stability, 2005, vol. 90, Iss. 2, pp. 303-312.

Gratzl et al, "Chapter 20: Chemistry of Pulping: Lignin Reactions," Lignin: Historical, Biological, and Materials Perspectives, (Ed. Glasser), American Chemical Society, 1999, pp. 392-421.

Hatakeyama et al., "Lignin Structure, Properties, and Applications," Advances in Polymer Science—Biopolymers, 2010, vol. 232, pp. 1-63.

Henton et al., "Chapter 16: Polylactic Acid Technology," Natural Fibers, Biopolymers, and Biocomposites, (Ed. Mohanty et al.), CRC Press, 2005, pp. 527-577.

Koljonen et al., "Precipitation of lignin and extractives on kraft pulp: effect on surface chemistry, surface morphology and paper strength," Cellulose, 2004, vol. 11, Iss. 2, pp. 209-224.

Košiková et al., "Role of lignin filler in stabilization of natural rubber-based composites," Journal of Applied Polymer Science, 2007, vol. 103, Iss. 2, pp. 1226-1231.

Le Digabel et al., "Properties of thermoplastic composites based on wheat-straw lignocellulosic fillers," Journal of Applied Polymer Science, 2004, vol. 93, Iss. 1, pp. 428-436.

Li et al., "Alkylated Kraft Lignin-Based Thermoplastic Blends with Aliphatic Polyesters," Macromolecules, 2002, vol. 35, Iss. 26, pp. 9707-9715.

Lora et al. "Recent Industrial Applications of Lignin: A Sustainable Alternative to Nonrenewable Materials," Journal of Polymers and the Environment, 2002, vol. 10, Iss. 1-2, pp. 39-48.

Meister et al., "Graft 1-phenylethylene copolymers of lignin. 1. Synthesis and proof of copolymerization," Macromolecules, 1991, vol. 24, Iss. 26, pp. 6843-6848.

Muller et al. "Engineering Plastics from Lignin. IX. Phenolic Resin Synthesis and Characterization," The Journal of Adhesion, 1984, vol. 17, Iss. 3, pp. 185-206.

Ouyang et al., "Poly(Lactic Acid) Blended with Cellulolytic Enzyme Lignin: Mechanical and Thermal Properties and Morphology Evaluation," Journal of Polymers and the Environment, 2012, vol. 20, Iss. 1, pp. 1-9.

Pucciariello et al., "Physical properties of straw lignin-based polymer blends," Polymer, 2004, vol. 45, Iss. 12, pp. 4159-4169.

Rasal et al., "Poly(lactic acid) modifications," Progress in Polymer Science, 2010, vol. 35, Iss. 3, pp. 338-356.

Sahoo et al., "Enhanced properties of lignin-based biodegradable polymer composites using injection moulding process," Composites Part A: Applied Science and Manufacturing, 2011, vol. 42, Iss. 11, pp. 1710-1718.

Setua et al., "Lignin reinforced rubber composites," Polymer Composites, 2000, vol. 21, Iss. 6, pp. 988-995.

Shimamura et al. "Mechanical Properties of Carbon Nanofiber Reinforced Polylactic Acid," Key Engineering Materials: The Mechanical Behavior of Materials X, 2007, vol. 345-346, pp. 1225-1228.

Thielemans et al., "Novel applications of lignin in composite materials," Journal of Applied Polymer Science, 2002, vol. 83, Iss. 2, pp. 323-331.

Thielemans et al., "Butyrated kraft lignin as compatibilizing agent for natural fiber reinforced thermoset composites," Composites Part A: Applied Science and Manufacturing, 2004, vol. 35, Iss.3, pp. 327-338.

Thielemans et al., "Lignin Esters of Use in Unsaturated Thermosets: Lignin Modification and Solubility Modeling," Biomacromolecules, 2005, vol. 6, Iss. 4 pp. 1895-1905.

Official Action for U.S. Appl. No. 14/015,727 mailed Jul. 17, 2014, 11 pages.

\* cited by examiner

Alkali Lignin

Organosolv Lignin

POLYLACTIDE-GRAFT-LIGNIN BLENDS AND COPOLYMERS

CROSS REFERENCE TO RELATED APPLICATIONS

This non-provisional patent application claims the benefit of priority from U.S. Provisional Patent Application No. 61/615,689 filed Mar. 26, 2012, the entire disclosure of which is hereby incorporated by reference in its entirety.

TECHNICAL FIELD

This invention relates to the syntheses of novel polylactide-graft-lignin blends and copolymers and the method of making the same.

SUMMARY

As the lignocellulosic biorefining industry emerges as a viable fuels technology, the availability of the assortment of lignins will also expand. Lignin's physicochemical features that attribute to its prospective utilization in determining a value-added product includes a three dimensional aromatic-based structure and an abundance of reactive functional groups in order to manipulate the hydrophobicity of lignin. Both alkali lignin and organosolv lignin were butyrated before being combined with poly(lactic acid) (PLA) via melt blending into composites and solution polymerization into grafted into copolymers. The composites' impact strength and toughness decreased but the modulus and heat distortion temperatures improved. Although the thermomechanical properties weren't desirable, the results paved the road for the continuing research on the grafted copolymers. Gas permeation chromatography, dilute solution viscometry, differential scanning calorimetry, Fourier transform inferred spectroscopy, and solubility tests proved that the different functionalized lignins were successfully synthesized via solution polymerization to form a renewable PLA-graft-lignin copolymer. Although the copolymer is low molecular weight, it has potential to introduce a high value to the otherwise wasted lignin.

Lignin is the second most abundant natural biopolymer on the planet following cellulose, and easily the least utilized despite its great potential as both a filler, and a thermal and mechanical property modifier for other biopolymers. Lignin is found in the rigid xylem cell wall in all vascular plants providing support, acting as a water sealant and as a protector against various biological attacks. As a natural glue, lignin consists of 15-40% of the total material in the plant cell walls. Lignin is composed of an arrangement of 3 different phenylpropane units (PPU) crosslinked forming a complex structure that varies drastically from plant to plant. The three different PPUs; sinapyl alcohol, coniferyl alcohol, and p-coumaryl alcohol are illustrated in FIG. 1.

Lignin is industrially separated primarily using the sulfite, kraft, and soda pulping processes. Lignosulfonates today are: burned for energy, used as animal feedstock, agricultural and horticultural applications, additives in concrete, and utilized in lignin-phenol-formaldehyde resins. More than 99% of industrial produced kraft lignin's annual 70+ million tones are burned as a low value fuel in chemical recovery furnaces. The remaining kraft lignin has applications as rubber reinforcers, thermosetting and thermoplastic polymers, phenol-formaldehyde resins, panelboard adhesives, friction materials, and insulation. When lignin is isolated via the organosolv extraction process, it can be used for brake pads, oriented strand board (OSB), PF resins and polyurethane foams and epoxy-resins.

Poly(lactic acid) (PLA) is an aliphatic renewable thermoplastic that is readily biodegradable. Lactic acid is fermented from dextrose, the only natural isomer of cellulose, present in corn, sugar feedstocks, etc. PLA is limited thermally by a low glass transition temperature (softening point) and a low heat distortion temperature. A need exists to elucidate the synthesis and properties of novel polylactide-graft-lignin copolymers with higher impact strength.

As biocellulosic biorefining emerges as a viable fuel technology, there will be an abundance of lignin available. In order to be a successful industry, bioplastics will need to be competitive with plastic made from fossil fuels on a cost-performance basis in order to be widely adopted. Lignin is expected to improve properties in bioplastics and plastics by acting as a toughening agent; improving the connectivity of the network; adding additional stiffening groups to the matrix; acting as a sizing agent between natural fibers and the resin matrix; behaving as a comonomer for the resin; inducing plasticity in the deformation zone at crack tips to improve toughness; acts as a free radical trap to reduce radical scission effects during racture in highly cross linked polymer; improving flame resistance; modifying biodegradability; enhanced photoresistance and thermal stability; expanding fatigue lifetime; and green engineering of materials.

DETAILED DESCRIPTION

Figure 1A:
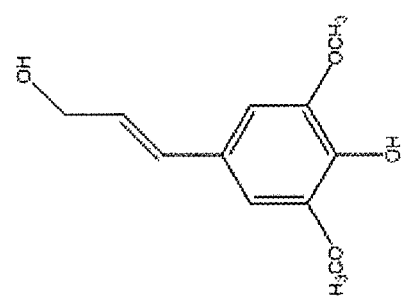
FIG. 1A illustrates sinapyl alcohol.
Figure 1B:
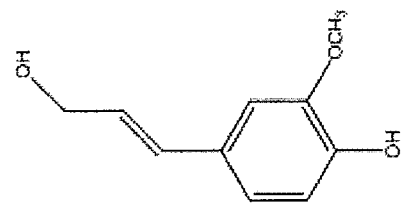
FIG. 1B illustrates coniferyl alcohol.
Figure 1C:
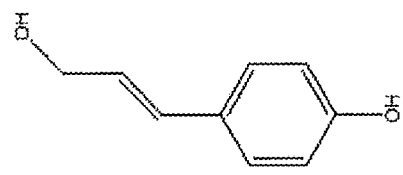
FIG. 1C illustrates p-coumaryl alcohol.

Lignin is abundant in plants and is a natural glue. Lignin is commonly found in the cell wall of vascular plants and bond together in woody stems, giving them their rigidity and impact resistance. The present invention is related to PLA-lignin polymers and copolymers and methods for making the same.

An embodiment of the invention is a butyrated lignin and the method of making the same. In order to determine if a condensation reaction with lactide and various lignins could take place, the assortment of lignins had their solubility's tested in lactic acid. Unexpectedly, all of the lignins: alkali (kraft) lignin (AL), organosolv lignin (OL), butyrated alkali lignin (BA), and butyrated organosolv lignin (BO) were completely soluble in lactic acid.

An aspect of the invention is a method to produce a polylactide-graft-lignin blend, the method comprising butyration of a lignin to produce a butyrated lignin, heating a polylactic acid to a temperature between about 160° C. to about 190° C., and mixing the heated polylactic acid with the butyrated lignin to produce a polylactide-graft-lignin blend.

Another aspect of the invention is a method to produce a polylactide-graft-lignin copolymer, the method comprising drying a lignin to produce a dried lignin, purging the dried lignin to produce a purged dried lignin, adding a solvent to the purged dried lignin to produce a suspension, adding purged lactide to the suspension to produce a lactide-suspension, adding a catalyst to the lactide-suspension to produce a mixture, and polymerizing the mixture to produce the polylactide-graft-lignin copolymer.

Another aspect of the present invention is a copolymer, the copolymer comprising a polylactide and a butyrated lignin.

Prior to butyration, lactic acid is dehydrated in an air oven at between about 150° C. to about 180° C. for between about 12 hours to about 48 hours. The lignin may then be added to the lactic acid. The weight percent of the lignin in the lactic acid should be between about 0.5 wt. % to about 20 wt. %. The lignin dissolved in lactic acid should be sonicated for about 3 hours prior to dehydration. After the reaction vessel has been set up with the materials within it, the temperature is ramped up to between about 70° C. to about 110° C., in some embodiments about 90° C., over between about 45 minutes to about 1.5 hours, in some embodiments about 1 hour, while a vacuum pump holds the pressure between about 80 torr to about 120 torr, in some embodiments at about 100 torr. After about one hour, the pressure of the system is reduced to between about 30 torr to about 70 torr, in some embodiments about 50 torr, and held for between about 45 minutes to about 1.5 hours, in some embodiments about 1 hour. After this process, the condensation reaction is ready.

A catalyst may be added at between about 0.5 wt % to about 1.5 wt %, in some embodiments about 1 wt %, with respect to lactic acid. The catalyst reduces the chance of random chain terminations, thereby resulting in a higher molecular weight lignin. Once added, the temperature of the mixture should be ramped up over between about 30 minutes to about 1.5 hours, in some embodiments about an hour, to the required reaction temperature set for the system which lies between about 120° C. and about 180° C., in some embodiments about 160° C. After the temperature ramp, the pressure is gradually reduced between about 30 minutes to about 1.5 hours, in some embodiments about 1 hour, to between about 30 torr and about 70 torr, in some embodiments about 50 torr. The reaction is allowed to run for between about 2 hours to about 10 hours, in some embodiments about 48 hours. Once the reaction is complete, the material is collected. Optionally, the lactic acid may be polymerized to the lignin utilizing azeotropic dehydration and distillation. This procedure may utilize diphenylether.

L-lactide was obtained through NatureWorks LLC. The OL was obtained from Dr. Robert Baldwin of the National Renewable Energy Laboratory (NREL). Low sulfur lignin, referred to as AL, anhydrous toluene, stannous octoate, and poly(acrylic acid) were obtained through Sigma-Aldrich. All chemicals and reactants were used as received. It is understood that any of these materials may be obtained from other suitable sources.

AL and OL were butyrated via the esterification procedure described by Thielemans and Wool with one alteration: the reaction time for complete esterification modification required was found to be about 168 hours while mixing vigorously. In some embodiments, the mixer was an Omni Mixer Homogenizer. This modification was required to regulate the lignin agglomeration size.

Figure 2:
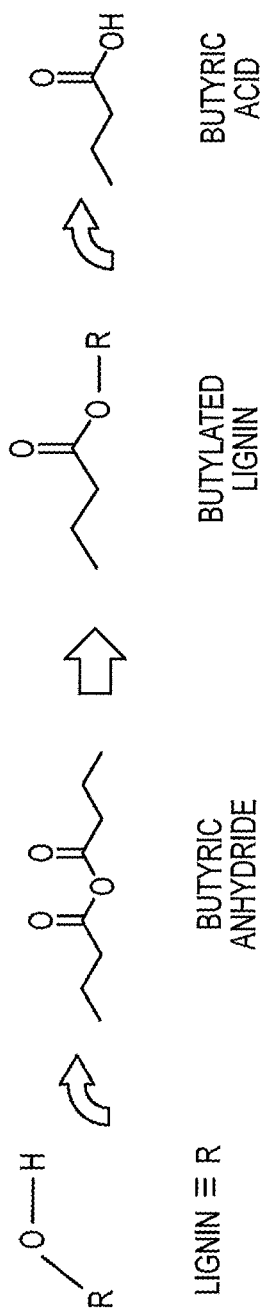
FIG. 2 illustrates the butyration of lignin via esterfication.

The process for the butyration of lignin is as follows. The lignins are dried at between about 100° C. and about 150° C., in some embodiments at about 125° C. in a convection oven for between about 12 hours to about 48 hours, in some embodiments about 24 hours. The lignin is reacted in butyric anhydride at between about 30° C. and about 75° C., in some embodiments about 50° C. under vigorous agitation. Though any suitable method may be used to agitate the reaction, an Omni homogenizer at about 4,000 rpm may be suitable. The reaction is reacted for between about 96 hours to about 264 hours, in some embodiments about 168 hours (approximately one week) and purged with an inert gas, such as nitrogen, argon, or helium. The lignin is isolated by extraction into diethyl-ester and washed at least once, in some embodiments at least three times, with DI water. FIG. 2 illustrates the overall butyration of lignin via esterfication.

Butyration increases the hydrophobicity of lignin and provides a better dispersion in hydrophobic solvents and polymers such as styrene, toluene, PLA and other polymers.

An embodiment of the present invention is a polylactide-graft-lignin blend and methods of making the same. AL and OL are butyrated via the esterfication procedure. The resulting lignins are BA and BO. PLA and lignin are dried separately in a convection oven between about 150° C. and about 180° C., in some embodiment about 125° C. for between about 6 hours to about 24 hours. A heated mixing structure is set to a temperature between about 160° C. and about 190° C., in some embodiments about 180° C. and a rpm of between about 15 rpms to about 30 rpms, in some embodiments about 25 rpms. In some embodiments, the mixing bowl may be a Haake mixing bowl. PLA is added to the mixing structure and allowed to reach full melt. Stabilizer solutions, such as Irgafos and/or Irganox, may be added, in some embodiments about 0.25 wt. %. Lignin is added to the heated PLA, preferably slowly, for consistent blending. The lignin may be added at weight percents between about 0.5 wt. % to about 40 wt. %. In some embodiments, the weight percent of the lignin is about 1%, about 3 wt. %, about 5 wt. %, about 8 wt. %, about 10 wt. %, about 15 wt. %, about 20 wt. %, about 25 wt. %, about 30 wt. %, about 35 wt. %, about 35 wt. % and about 40 wt. %. The mixture is mixed for between about 10 minutes to about 1 hour, in some embodiments about 15 minutes. The temperature may remain constant during mixing. The blended polymer may be removed and cooled, then granulated as desired.

Figure 3:
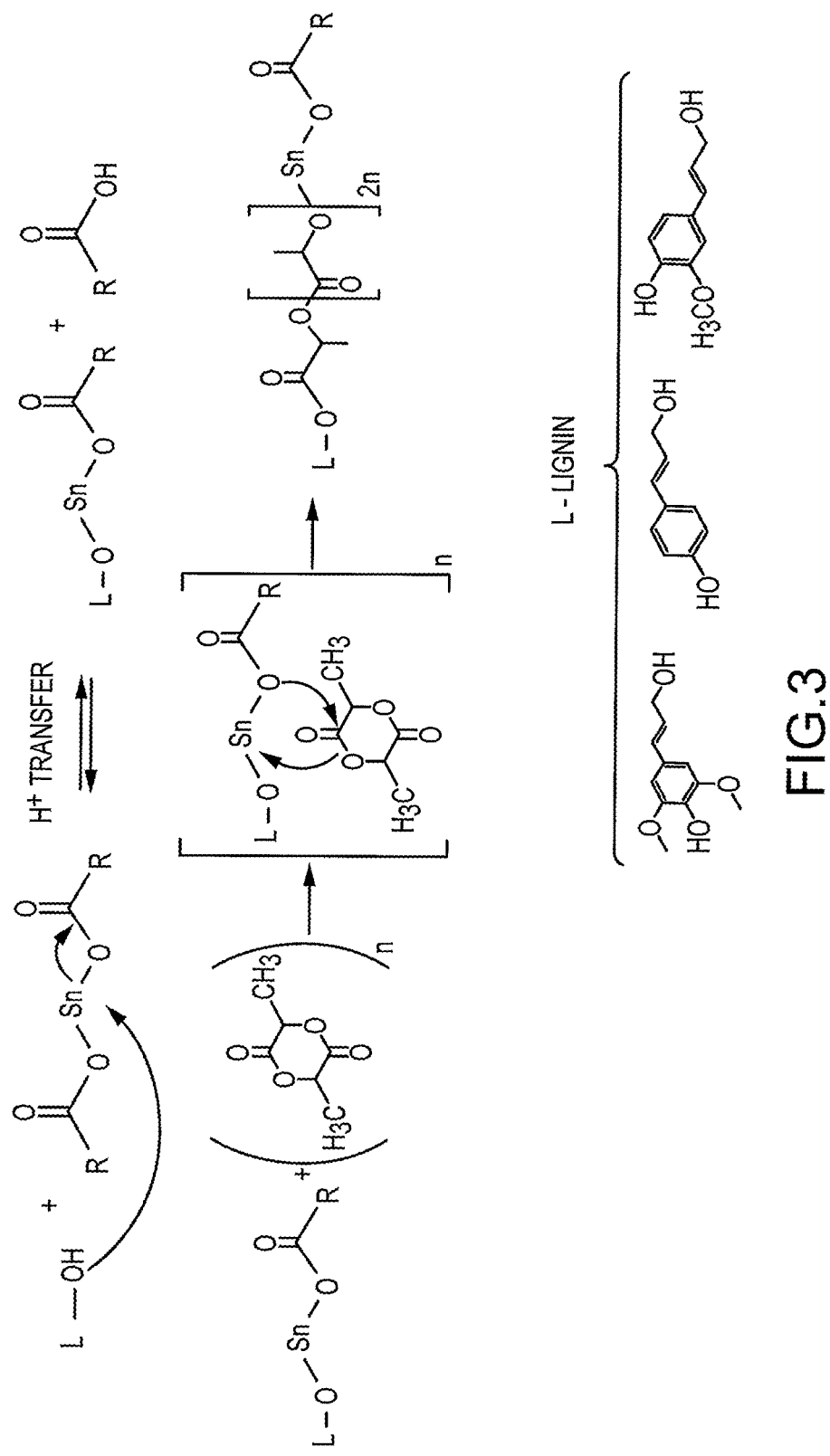
FIG. 3 illustrates the copolymer synthetic route.

In another embodiment of the invention, PLA-graft-lignin co-polymers may be produced. FIG. 3 illustrates the copolymer synthesis. Polymers where the native lignins are AL or OL resulted in low molecular weight. Polymers where the native lignins are butyrated lignin, BA or BO, resulted in moderate molecular weight precipitates. Lignins or combinations of different lignins are dried in a convection oven for between about 12 hours to about 48 hours, in some embodiments about 24 hours at between about 100° C. to about 150° C., in some embodiments about 125° C. before being transported to a vacuum oven operating at between about 75° C. to about 125° C., in some embodiments about 90° C. for at least about 12 hours. The lignin may be between about 0.5 wt. % to about 40 wt. % of the copolymer. In some embodiments, the weight percent of the lignin is about 1%, about 3 wt. %, about 5 wt. %, about 8 wt. %, about 10 wt. %, about 15 wt. %, about 20 wt. %, about 25 wt. %, about 30 wt. %, about 35 wt. %, about 35 wt. % and about 40 wt. %. Lactide (L-Lactide, D-Lactide or D-L-Lactide) is dehydrated under a vacuum of about a few millitorr (about 2 millitorr to about 10 millitorr) for at least about 48 hours prior to being used as a reactant. The lignin may be purged with argon, or another noble gas, and removed from the vacuum oven. A solvent, such as anhydrous toluene may be added to the lignin, obtaining about 0.28 g of lactide per about 1 mL solvent ratio. The suspension may be sonicated for between about 12 hours to about 48 hours, in some embodiments about 24 hours. The suspension may then be added to the purged lactide. A catalyst, such as stannous octoate, may be introduced to the suspension in an about 1 to about 2500 molar ratio to lactide before the solution polymerization is conducted between about 75° C. to about 125° C., in some embodiments about 90° C. in an oil bath for between about 60 hours to about 100 hours, in some embodiments about 80 hours.

Figure 4:
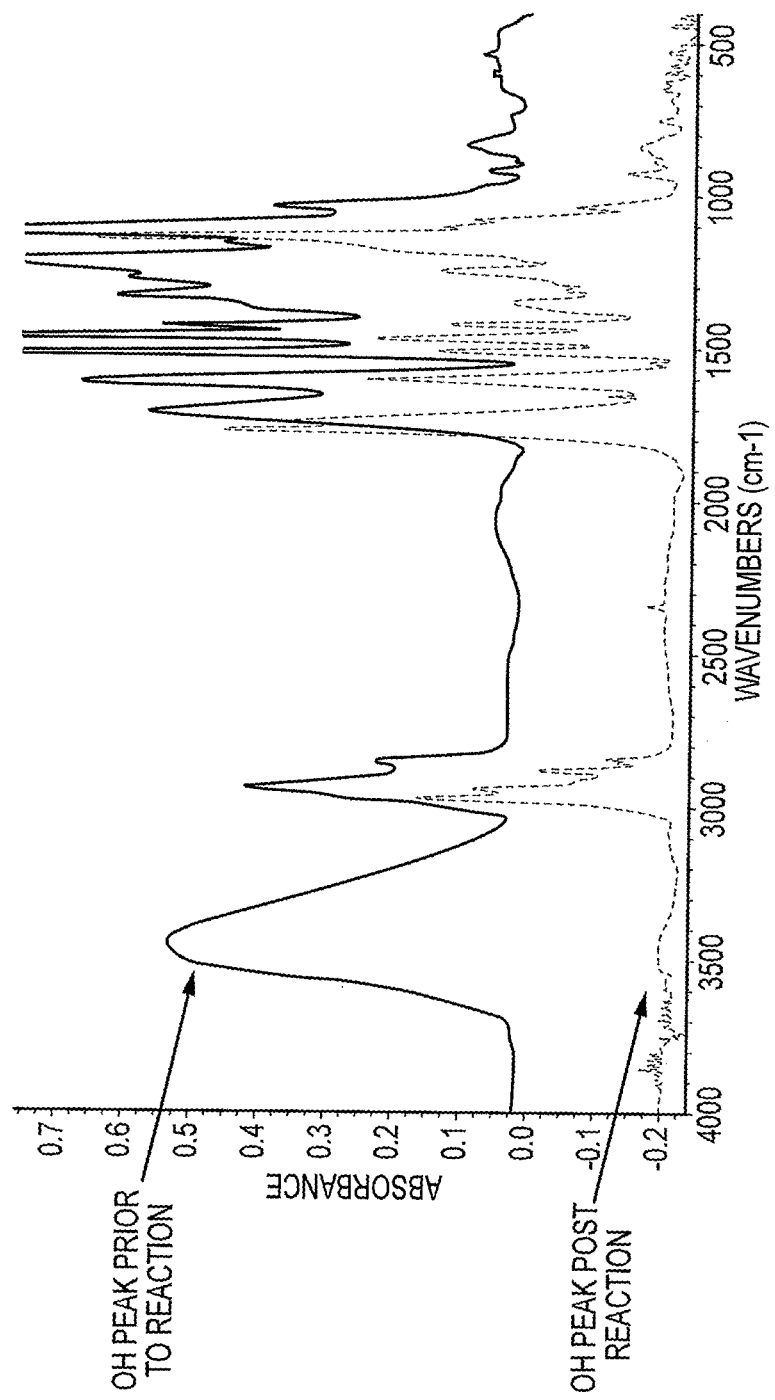
FIG. 4 illustrates the FTIR of organosolv lignin (OL) before and after butyration, superficially the OH prior to and after reaction.
Figure 5A:
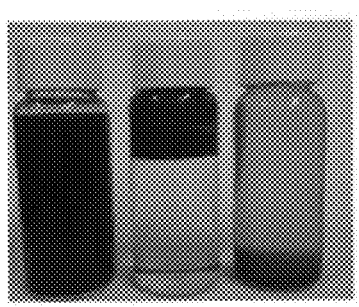
FIG. 5A illustrates samples of alkali lignin pre-butyration in water, chloroform and toluene (in order from right to left)
Figure 5B:
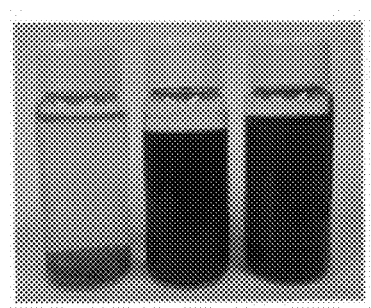
FIG. 5B illustrates samples of alkali lignin post-butyration in water, chloroform and toluene (in order from right to left)
Figure 5C:
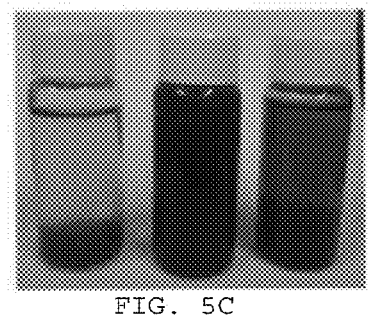
FIG. 5C illustrates samples of organosolv lignin pre-butyration in water, chloroform and toluene (in order from right to left)
Figure 5D:
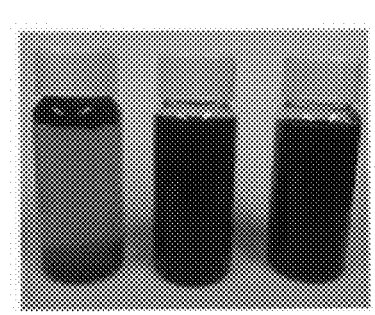
FIG. 5D illustrates samples of organosolv lignin post-butyration in water, chloroform and toluene (in order from right to left)

Fourier Transform Infrared Spectroscopy (FTIR) samples may be run to determine if the butyration was successful. FIG. 4 illustrates the FTIR of butyrated OL and illustrates a successful butyration.

Upon completion, between about 5 mL to about 15 mL of chloroform, in some embodiments about 10 mL of chloroform, may be added to dilute the polymer solution in order to prevent solidification during the cooling process. The reaction may be halted via addition of poly(acrylic acid) in the same ratio as the catalyst. The solution was then stirred for between about 12 hours to about 48 hours, in some embodiments about 24 hours. The resulting copolymer may be precipitated in a water-methanol mixture and vacuum dried.

EXAMPLES

Example 1

Experiments were run for all four types of lignin blends made with the melting process: AL, OL, BA, and BO ranging from about 0.5 to about 8 weight percent lignin.

FIG. 5 illustrates samples of AL and OL pre-butyration and post-butyration. The vials contain 1) water; 2) chloroform; and 3) toluene (in order from right to left).

The blends were prepared by melt mixing the lignin with PLA in a Haake. The temperature was about 180° C. and the rpm was about 25. Varying load levels (loading levels of 1, 3, 5, 8 wt % (all) and 16, 32 wt % (AL)) were used and the samples were injection molded.

Table 2 illustrates the effect of the catalyst on the chance of random chain terminations. Samples of the copolymer were analyzed using a differential scanning calorimetry and the results are shown in Table 1. The samples were dried in a convection oven for between about 12 to about 24 hours at about 125° C. The values listed in Table 1 may be compared to pure PLA, which has a Tg of 61° C. and a Tm of 174° C. The SPBO__1% has a lower Tg than the SPVO__1%__10×Cata or SPBO__1%__100×Cata samples possibly due to the lack of extra catalyst. The abundance of the catalyst allows the reaction to occur more quickly reducing the chances of random chain terminations. The experimental percent crystallinity is higher than that of pure PLA, which has a maximum crystallinity of 34%. The increased crystallinity is indicative of the shorter PLA chains, which is due to the shorter chains increased ability to align into a crystalline structure.

TABLE 1

| Copolymer* | Tg (° C.) | Tm (° C.) | % Crystallinity |
|---|---|---|---|
| SPBO__0.5% | 51.4 | 161.3 | 49.8 |
| SPBO__1% | 35.3 | 149.8 | 46.4 |
| SPBO__1%__10xCata | 54.6 | 161.3 | 54.9 |
| SPBO__1%__100xCata | 56.2 | 161.6 | 51.7 |

*SP—Solution Polymerized; BO—Butyrated Organosolv Lignin

Figure 6:
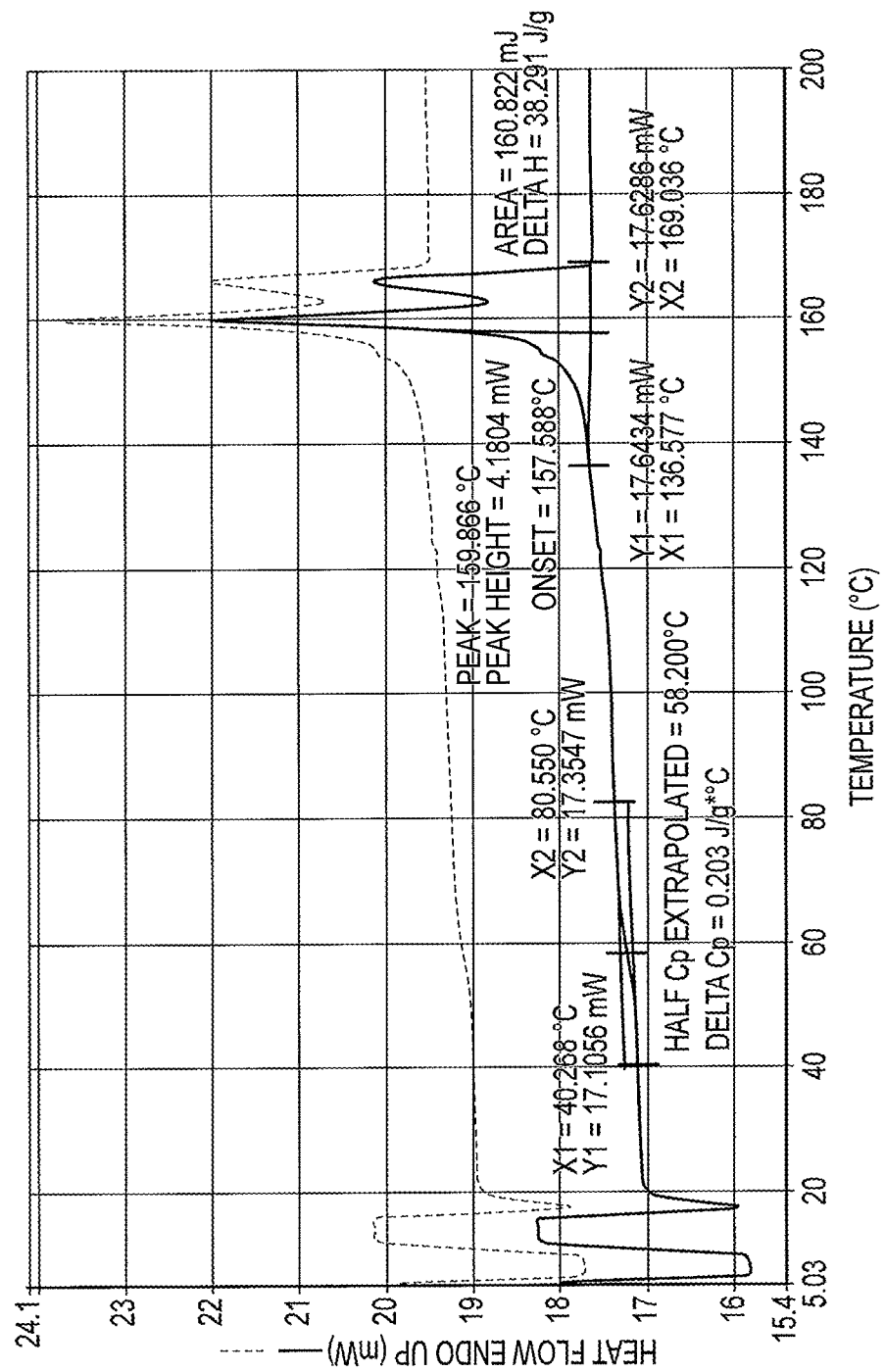
FIG. 6 depicts DSC scans of blended polymers, the thermal properties of the blended polymers are denoted on the DSC scans.

FIG. 6 illustrates the thermal properties such as glass transition, melting temperature and percent crystallinity as analyzed on the blended samples using a DSC.

Table 2 illustrates the effect of adding different lignin to PLA. Samples 1-6 contain PLA and varying amounts of AL. Samples 7-10 contain PLA and varying amounts of OL. Samples 11-14 contain PLA and varying amounts of BO. Samples 15-17 contain PLA and varying amounts of BA. A control was also used that only contains PLA. Only two samples showed a depressed Tg compared to the control sample (Sample 8 and Sample 14). There was no strong effect on the melting point of percent crystallinity.

TABLE 2

| Sample Number | Sample | Tg (° C.) | Tm (° C.) | % Crystallinity |
|---|---|---|---|---|
| Control | PLA | 58.9 | 174.4 | 40.7 |
| 1 | PLA-AL 1% MB | 58.3 | 169.8 | 41.0 |
| 2 | PLA-AL 3% MB | 59.1 | 171.7 | 40.5 |
| 3 | PLA-AL 5% MB | 59.2 | 172.0 | 45.1 |
| 4 | PLA-AL 8% MB | 59.8 | 174.2 | 42.3 |
| 5 | PLA-AL 16% MB | 57.9 | 169.5 | 47.1 |
| 6 | PLA-AL 32% MB | 57.5 | 167.9 | 42.8 |
| 7 | PLA-OL 1% MB | 58.0 | 170.1 | 42.4 |
| 8 | PLA-OL 3% MB | 59.5 | 169.6 | 36.9 |
| 9 | PLA-OL 5% MB | 57.8 | 169.8 | 40.2 |
| 10 | PLA-OL 8% MB | 57.0 | 169.5 | 43.3 |
| 11 | PLA-BO 1% MB | 59.6 | 173.9 | 41.5 |
| 12 | PLA-BO 3% MB | 58.0 | 169.3 | 40.4 |
| 13 | PLA-BO 5% MB | 57.9 | 169.8 | 47.0 |
| 14 | PLA-BO 8% MB | 56.2 | 170.1 | 41.4 |
| 15 | PLA-BA 1% MB | 58.6 | 170.9 | 41.0 |
| 16 | PLA-BA 3% MB | 59.0 | 170.6 | 41.0 |
| 17 | PLA-BA 5% MB | 58.0 | 169.8 | 41.1 |

Figure 7:
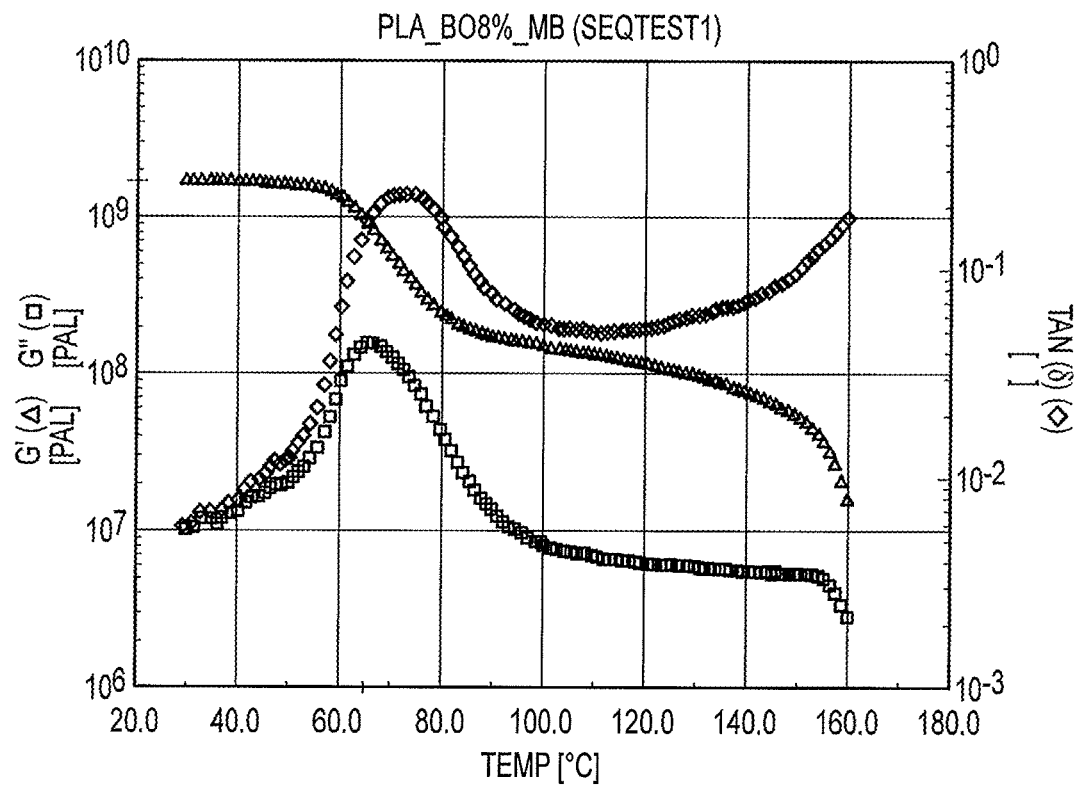
FIG. 7 depicts the DMTA determined storage modulus (G'), loss modulus (G") and tan(δ) for a PLA-BO 8% MB over a temperature range.

Tensile testing was also performed on samples. FIG. 7 illustrates DMTA analysis for a PLA-BO 8% MB sample. G' is the storage modulus and G" is loss modulus. The DMTA data was analyzed to obtain heat distortion temperatures (HDT).

Table 3 illustrates the effect of lignin loading in PLA compared to a control sample. Samples 1-6 contain PLA and varying amounts of AL. Samples 7-10 contain PLA and varying amounts of OL. Samples 11-14 contain PLA and varying amounts of BO. Samples 15-17 contain PLA and varying amounts of BA. A control was also used that only contains PLA.

TABLE 3

| Sample Number | Sample | % Crystallinity | $T_{HDT}$ (° C.) |
|---|---|---|---|
| Control | PLA | 40.7 | 75.7 |
| 1 | PLA-AL 1% MB | 41.0 | 77.9 |
| 2 | PLA-AL 3% MB | 40.5 | 77.2 |
| 3 | PLA-AL 5% MB | 45.1 | 77.2 |
| 4 | PLA-AL 8% MB | 42.3 | 81.5 |
| 5 | PLA-AL 16% MB | 47.1 | 82.1 |
| 6 | PLA-AL 32% MB | 42.8 | 112.6 |
| 7 | PLA-OL 1% MB | 42.4 | 77.2 |
| 8 | PLA-OL 3% MB | 36.9 | 78.4 |
| 9 | PLA-OL 5% MB | 40.2 | 79.4 |
| 10 | PLA-OL 8% MB | 43.3 | 82.1 |
| 11 | PLA-BO 1% MB | 41.5 | 77.6 |
| 12 | PLA-BO 3% MB | 40.4 | 76.7 |
| 13 | PLA-BO 5% MB | 47.0 | 78.2 |
| 14 | PLA-BO 8% MB | 41.4 | 78.6 |
| 15 | PLA-BA 1% MB | 41.0 | 76.6 |
| 16 | PLA-BA 3% MB | 41.0 | 77.0 |
| 17 | PLA-BA 5% MB | 41.1 | 77.0 |

Figure 8:
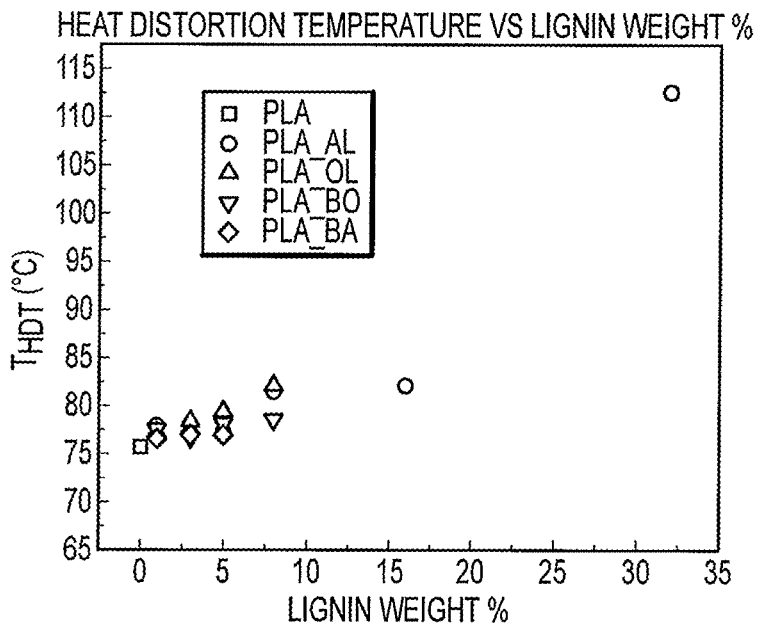
FIG. 8 depicts heat distortion temperatures ($T_{HDT}$) of poly (lactic acid) (PLA) having varying weight percent of alkali (kraft) lignin, organosolv lignin (OL), butyrated alkali lignin (BA) and butyrated organosolv lignin (BO)

FIG. 8 illustrates HDT as a function of weight percent of different lignin samples (AL; OL; BO; BA). FIG. 8 illustrates that high lignin loading shows an increased HDT.

Figure 9:
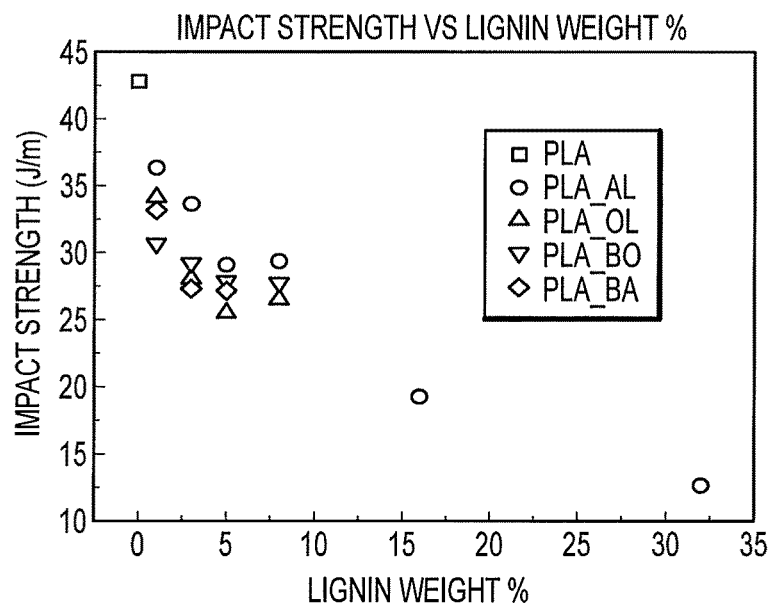
FIG. 9 depicts the effect of impact resistance of poly(lactic acid) (PLA) and poly(lactic acid) (PLA) having varying weight percent of alkali (kraft) lignin (AL), organosolv lignin (OL), butyrated alkali lignin (BA), and butyrated organosolv lignin (BO)

Impaction tests were also performed on the samples. The samples were injected molded and crystallized at about 110° C. The samples were annealed at room temperature for a minimum of about 48 hours. A 5 lb pendulum was used for testing. FIG. 9 illustrates the effect of impact resistance as a function of the weight percent of the lignin for different types of lignin. The increased weight loading decreased the impact resistance.

Figure 10:
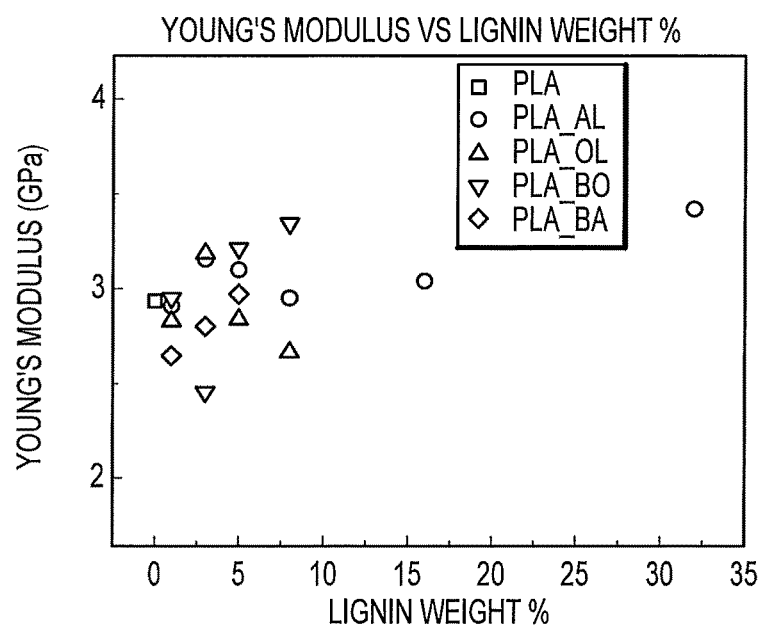
FIG. 10 depicts Young's Modulus of poly(lactic acid) (PLA) and poly(lactic acid) (PLA) having varying weight percent of alkali (kraft) lignin (AL), organosolv lignin (OL), butyrated alkali lignin (BA), and butyrated organosolv lignin (BO)
Figure 11:
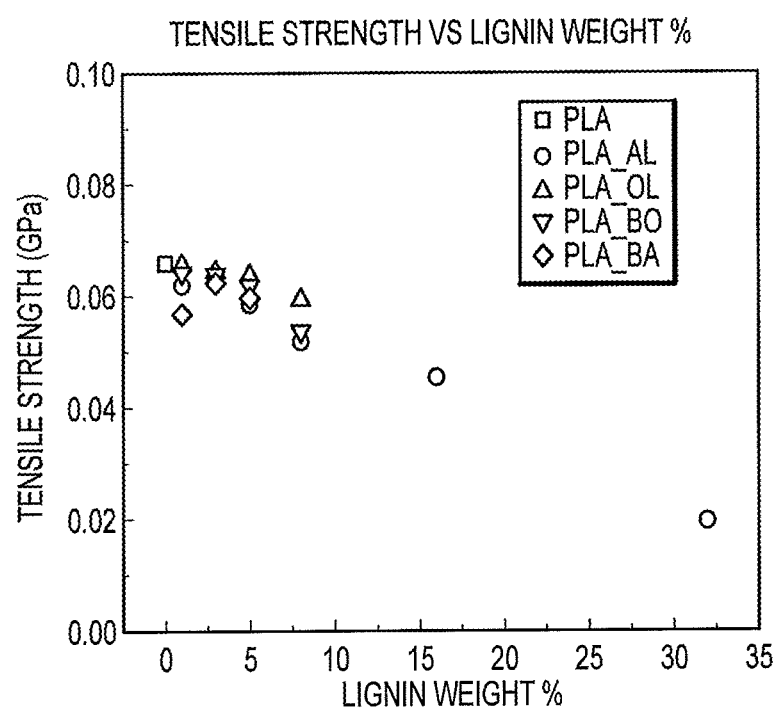
FIG. 11 depicts tensile strength of poly(lactic acid) (PLA) and poly(lactic acid) (PLA) having varying weight percent of alkali (kraft) lignin (AL), organosolv lignin (OL), butyrated alkali lignin (BA), and butyrated organosolv lignin (BO)

Tensile testing was performed per ASTM D638 on samples that were injection molded. The samples were pulled at a rate of extension of about 2 inches per minute. As illustrated in FIG. 10, the Young's modulus increased as a function of weight percent of different lignin types. The data for Young's modulus for a couple of the composites, PLA-AL and PLA-BA appear to have an increasing trend as the lignin loading level was increased. The increasing trend in the Young's modulus, meaning a stiffer or more brittle composite as a lignin weight loading increases, aids in the conclusion that the lignin is only acting as a filler within the composite. The tensile strength decreased as a function of weight percent of different lignin types as illustrated in FIG. 11.

Figure 12:
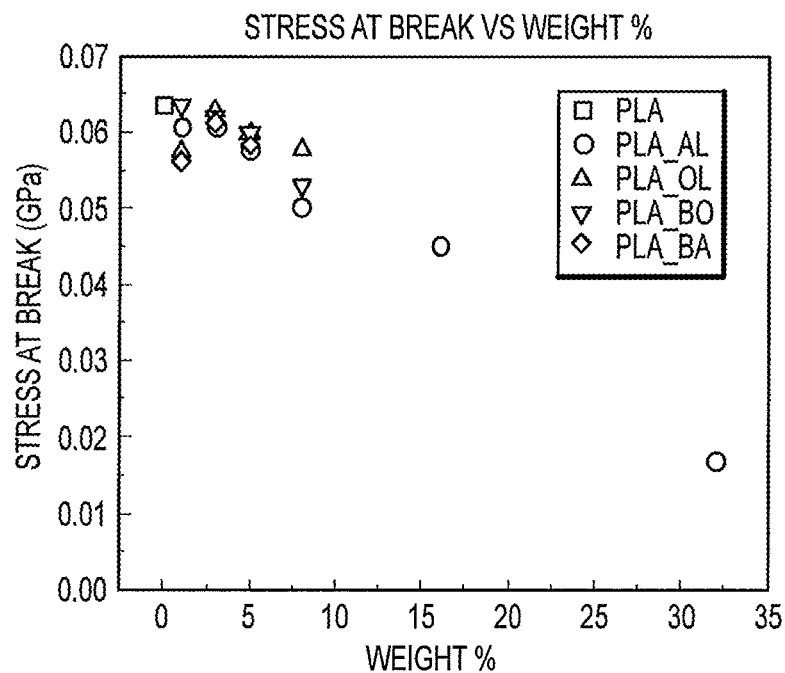
FIG. 12 depicts stress at break of poly(lactic acid) (PLA) and poly(lactic acid) (PLA) having varying weight percent of alkali (kraft) lignin (AL), organosolv lignin (OL), butyrated alkali lignin (BA), and butyrated organosolv lignin (BO)

FIG. 12 illustrates a stress at break curve as a function of weight percentage for different PLA-lignins at different weight percentages. Compared to the PLA alone, there is a decrease in the stress at break for the different PLA-lignins at different weight percentages.

Figure 13:
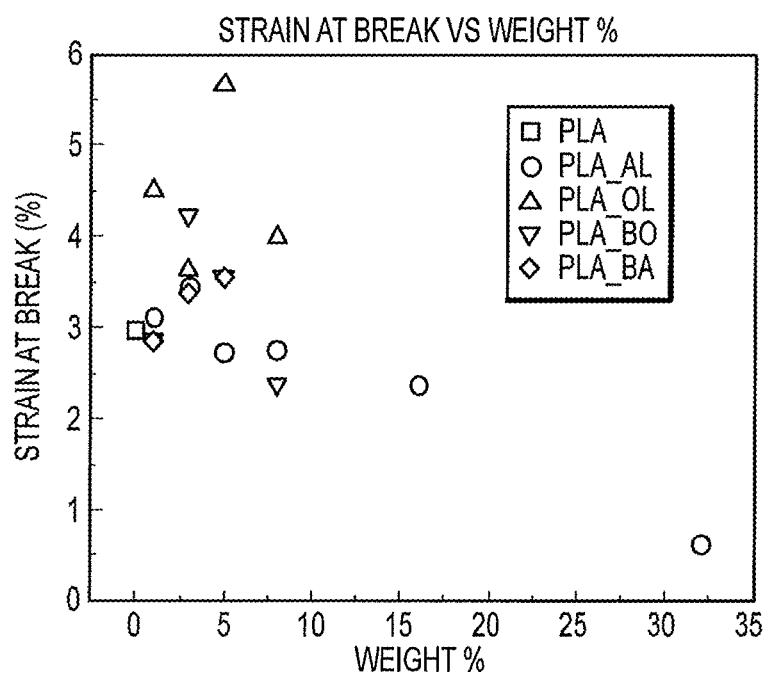
FIG. 13 depicts strain at break of poly(lactic acid) (PLA) and poly(lactic acid) (PLA) having varying weight percent of alkali (kraft) lignin (AL), organosolv lignin (OL), butyrated alkali lignin (BA), and butyrated organosolv lignin (BO)

FIG. 13 illustrates strain at break as a function of weight percent for different PLA-lignins at different weight percentages. The figure illustrates a random distribution of the strain at break compared to the PLA alone.

Figure 14:
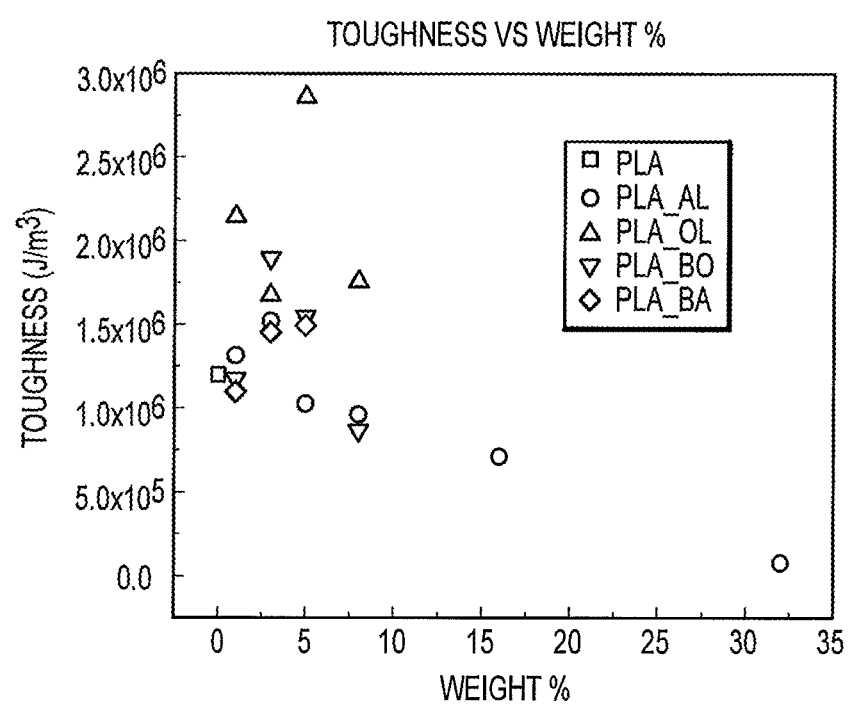
FIG. 14 depicts toughness of poly(lactic acid) (PLA) and poly(lactic acid) (PLA) having varying weight percent of alkali (kraft) lignin (AL), organosolv lignin (OL), butyrated alkali lignin (BA), and butyrated organosolv lignin (BO)

FIG. 14 illustrates toughness as a function of weight percent for different PLA-lignins at different weight percentages. The figure illustrates a random distribution of the strain at break compared to PLA alone.

The tensile data indicates that the tensile strength and stress at break both decreased in the composite compared to the PLA alone. Tensile strength and stress at break are theoretically the same quantities although there are discrete differences in the associated Figures. The differences could be accounted for in mechanical error. The data for strain at break, toughness, and Young's modulus was seemingly completely random even after completing the tensile tests with five samples per composite, and eliminating the major outliers using a Q-test at a 90% confidence. Both the strain at break and toughness graphs looked similar due to the fact that the composites were very brittle and would break before reaching the yield peak while graphed on a stress vs. strain plot.

Figure 15:
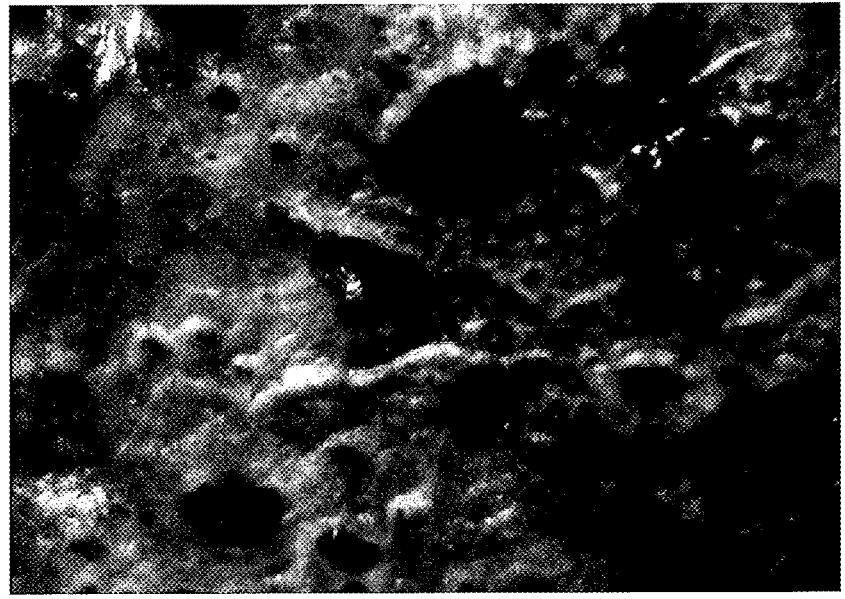
FIG. 15 depicts an optical micrograph of PLA-lignin composite at 80× magnification.
Figure 16:
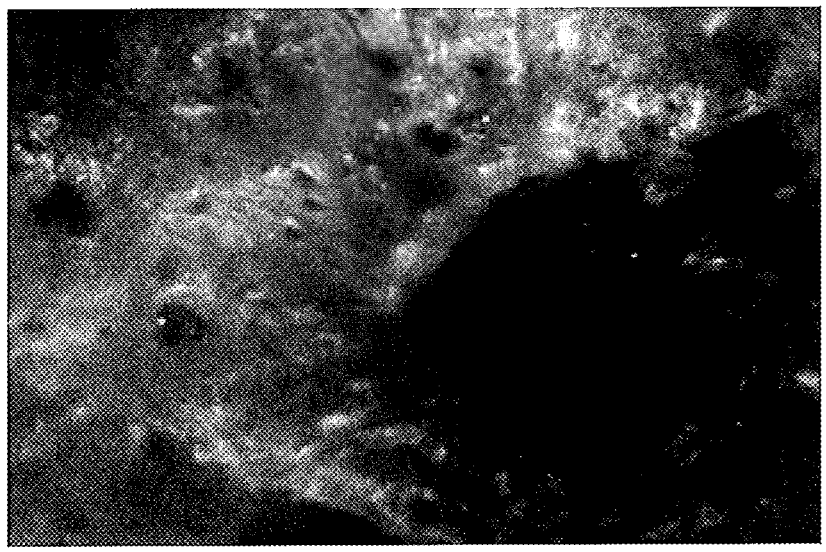
FIG. 16 depicts an optical micrograph of an PLA-lignin composite at 100× magnification.

Optical microscopy was utilized in order to verify that the various lignins were only acting as a filler in the composites. FIG. 15 and FIG. 16 illustrate chunks of lignin that are clearly visible within the poly(lactic acid). FIG. 15 illustrates PLA-lignin composite at 80× showing large chunks of undispersed lignin throughout the PLA samples. The lignin chunks are about 100 μm to about 200 μm. FIG. 16 illustrates an PLA-lignin composite at 100× showing large lignin chunks. The large lignin chunks are roughly about 100 μm to about 200 μm.

Figure 17A:
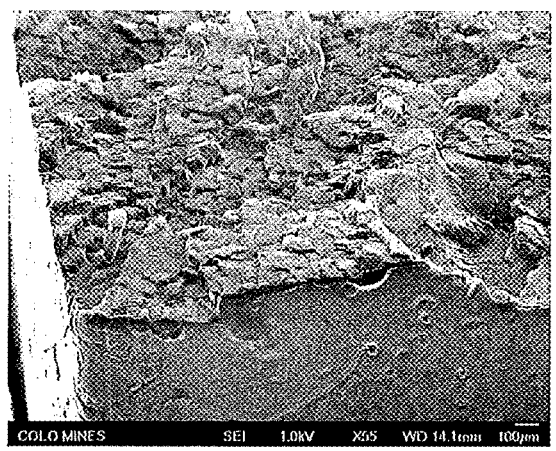
FIG. 17A depicts a field emission scanning electron microscope of the rough surface of PLA-BO 3% composite at 55× magnification.
Figure 17B:
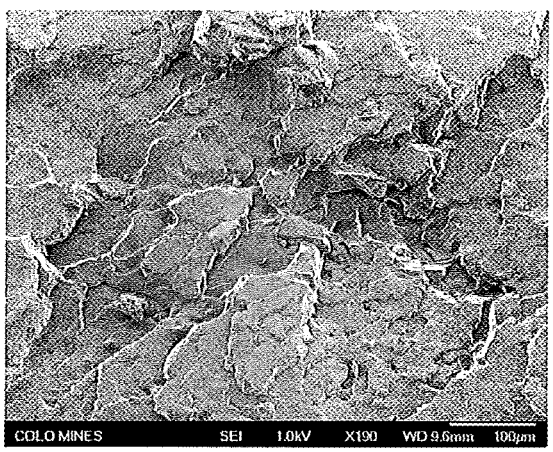
FIG. 17B depicts a field emission scanning electron microscope of the rough surface of the PLA-BO 3% composite at 190× magnification.
Figure 18A:
FIG. 18A depicts a field emission scanning electron microscope of PLA-BA 3%.
Figure 18B:
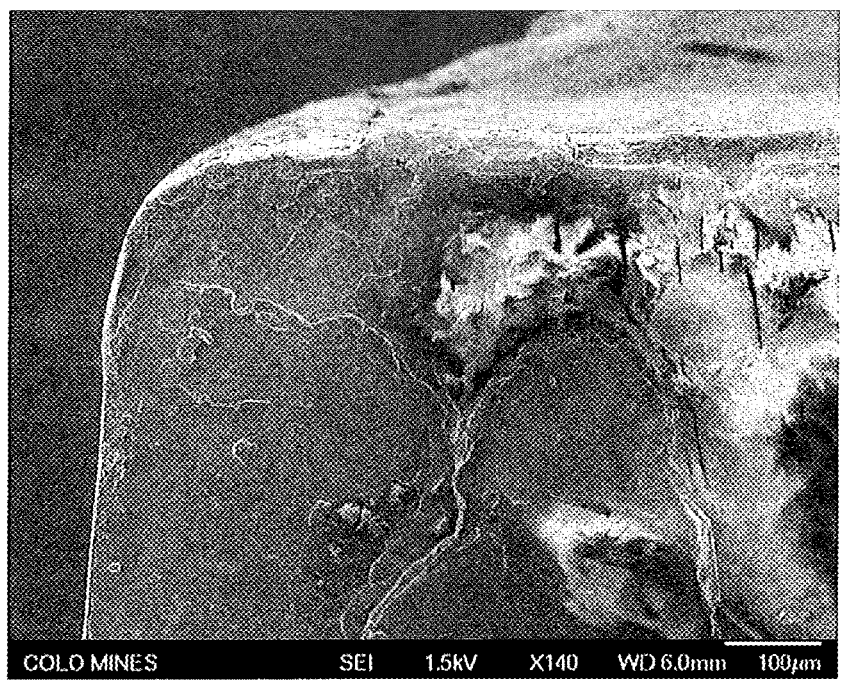
FIG. 18B depicts a field emission scanning electron microscope of PLA alone.

The Field Emission Scanning Electron Microscope (FESEM) was utilized to see the surface morphology of composites. The surface morphology was used to identify the lignin agglomeration in the composites and compare it to the PLA homopolymer. FIG. 17A and FIG. 17B illustrate FESEM images of the rough surface of the PLA-BO 3% composite due to the lignin acting as a filler. FIG. 17A illustrates the rough surface of the PLA-BO 3% composite at 55× magnification. FIG. 17B illustrates the rough surface of the PLA-BO 3% composite at 190× magnification. The composites' rough surface exemplifies how the lignin caused the composites to be brittle and not ductile. The morphology highlighted the fact that lignin acted as a rigid filler in the composite. FIG. 18A and FIG. 18B are FESEM images of PLA-BA 3% and PLA alone, respectively, both at 140×. FIG. 18A clearly illustrates a large chunk of lignin, approximately 70 μm in size, in the composite. These large chunks of lignin help solidify the hypothesis that the lignin was acting as a filler within the composites produced due to poor mixing during both the butyration and during the melt mixing.

The PLA-lignin composites were successfully produced with both promising results among the disappointing properties that resulted. Despite the hydrophobic nature of modified lignin, poor impact properties result when melt mixed. The poor properties may have been a result of limited mixing during the Haake melt mixing which was proved by the microscopy and FESEM images of the large chunks of lignin present in the composites. The large chunks meant that the lignin did not sufficiently disperse resulting in the lignin acting as a rigid filler.

The DSC and TGA graphs illustrated that almost no changes were made between the composites and the PLA homopolymer. The impact resistance, tensile strength, and stress at break properties all decreased when compared to the PLA homopolmer as lignin loading increased. A promising result was seen in the data from the DMTA where the heat distortion temperature increased as lignin loading levels increased. Also, the increasing trends in Young's modulus were promising although it aided in the conclusion that the lignin was only acting as a rigid filler within the composite.

These thermal and mechanical properties matched literature for PLA and various types of lignin blends, which also concluded that lignin was a suitable filler for PLA.

Example 2

Figure 19:
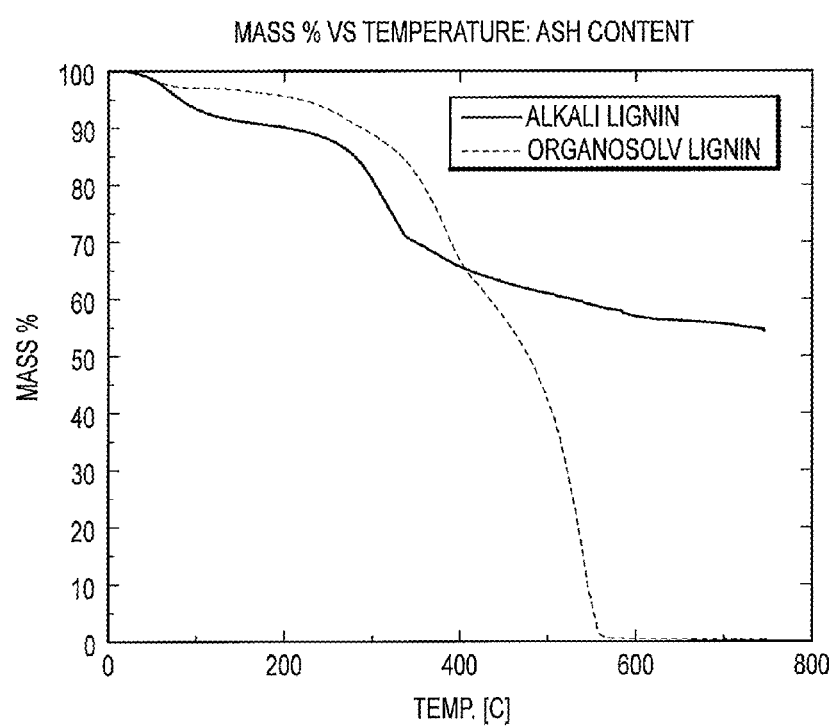
FIG. 19 depicts the ash content of an alkali lignin sample and an organosolv lignin sample over a temperature range.
Figure 20:
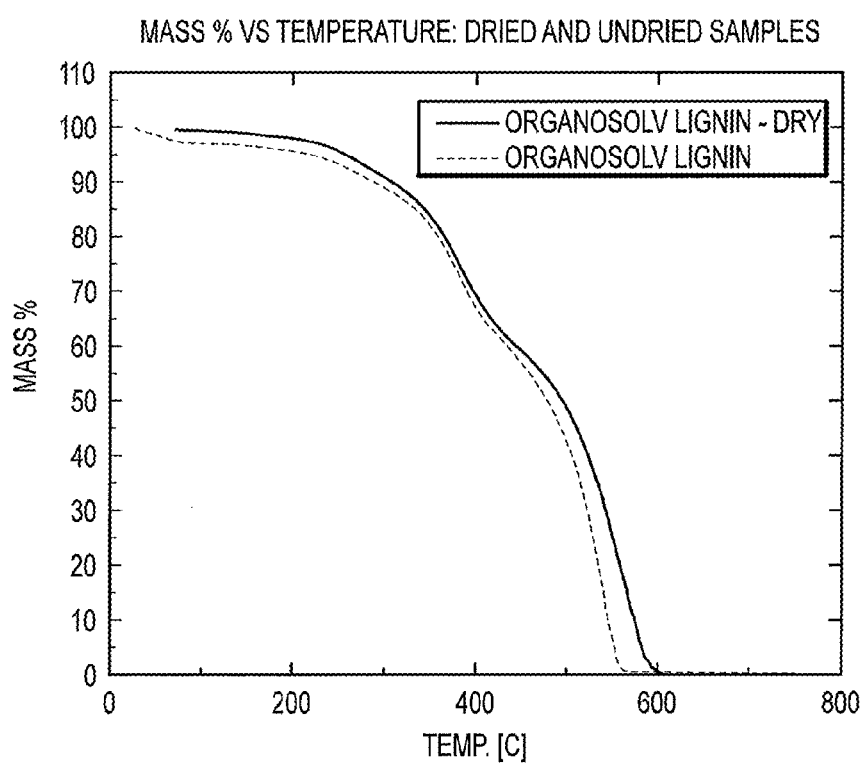
FIG. 20 depicts the mass percent of dried OL samples and undried OL over a temperature range.

Experiments were conducted on the PLA-graft-lignin copolymers. The drying and ash content present in native lignins were analyzed in order to determine the purity of the lignin. FIG. 19 illustrates the ash content of an AL sample and an OL sample. The ash content of AL was about 55%. The ash content of OL was about 0%. The high ash content of AL may pose a problem during functionalization and solution polymerization. Therefore, AL should be washed repeatedly with DI water to remove most, if not all, of the ash. FIG. 20 illustrates the mass percent of dried OL samples v. undried OL samples. The samples were dried in a convention oven at about 125° C. for about 24 hours. To ensure that drying was complete, the lignin was transported to a vacuum oven operating at 90° C. for at least 12 hours.

Figure 21:
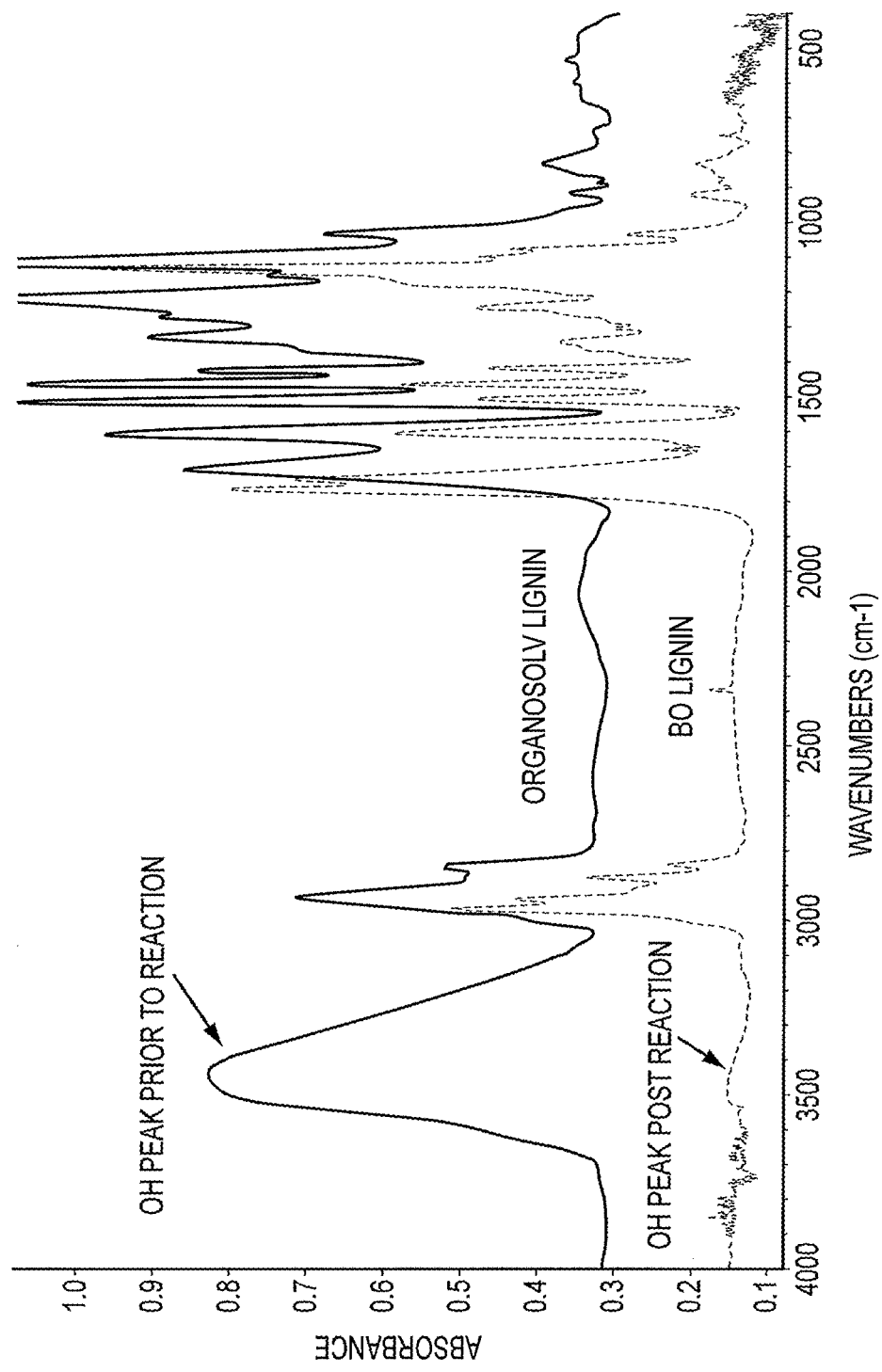
FIG. 21 depicts the FTIR of organosolv lignin and butyrated organosolv lignin.
Figure 22:
FIG. 22 depicts an optical micrograph of butyration of AL after one hour at 80× magnification.
Figure 23:
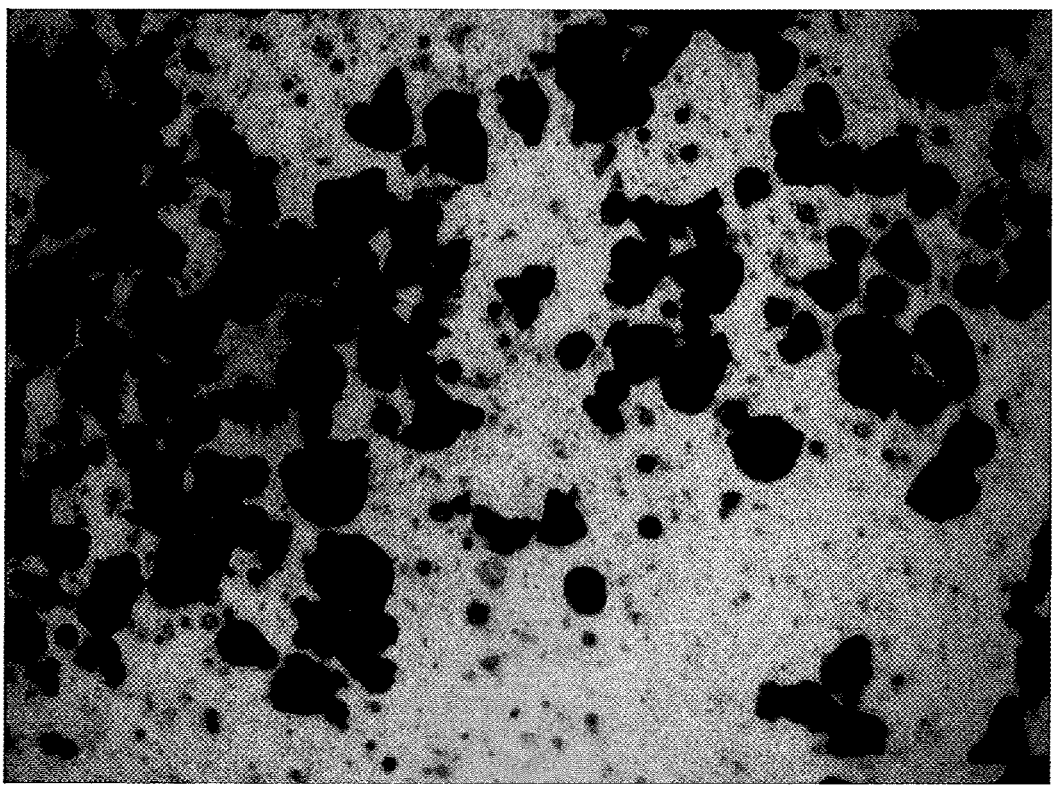
FIG. 23 depicts an optical micrograph of butyration of AL after six hours at 80× magnification.
Figure 24:
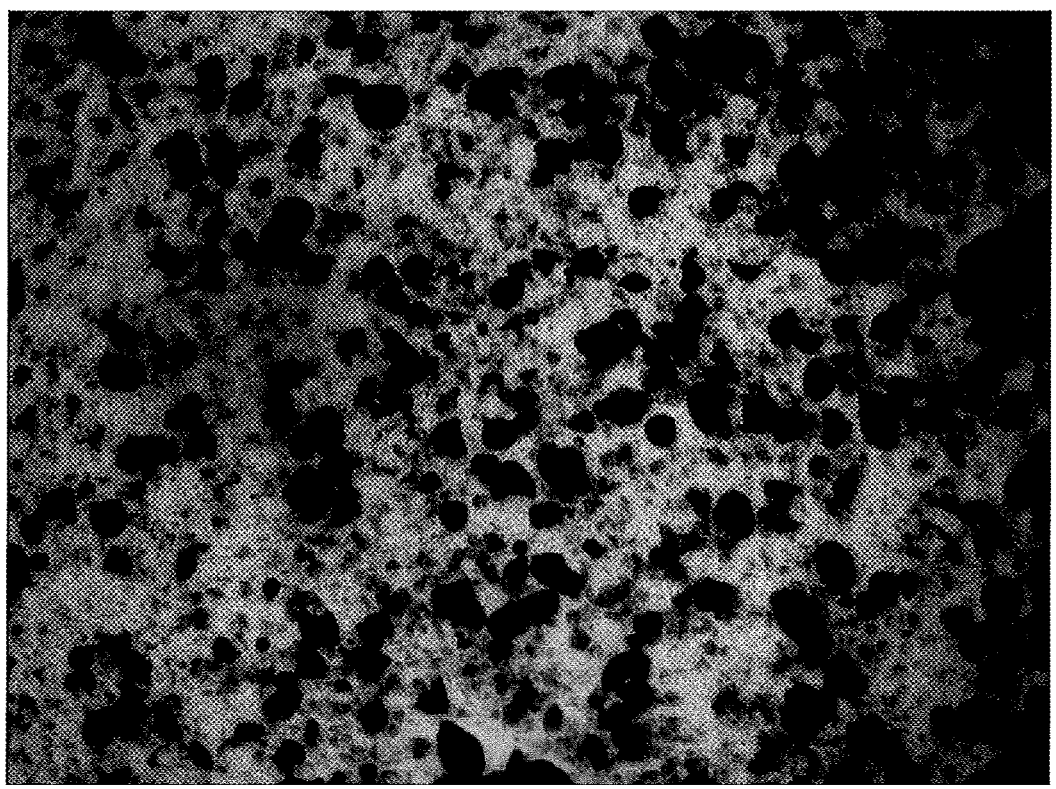
FIG. 24 depicts an optical micrograph of butyration of AL after 72 hours at 80× magnification.
Figure 25:
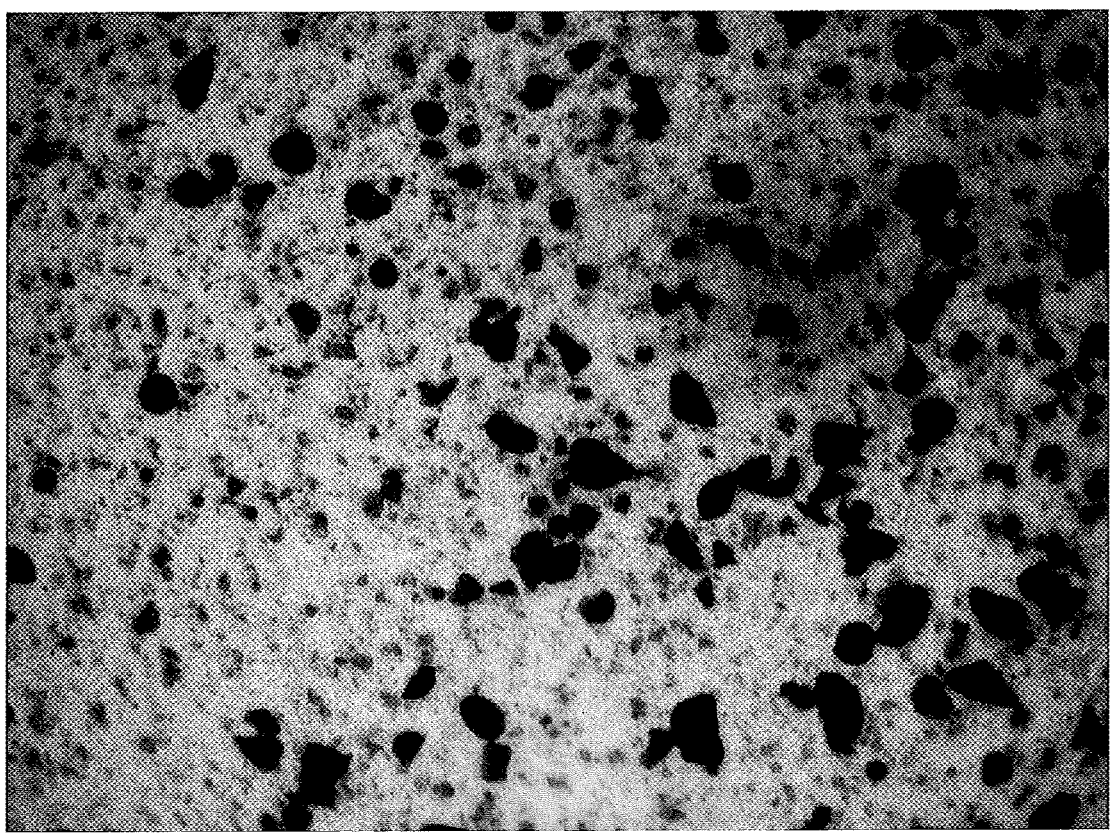
FIG. 25 depicts an optical micrograph of butyration of AL after 144 hours at 80× magnification.
Figure 26:
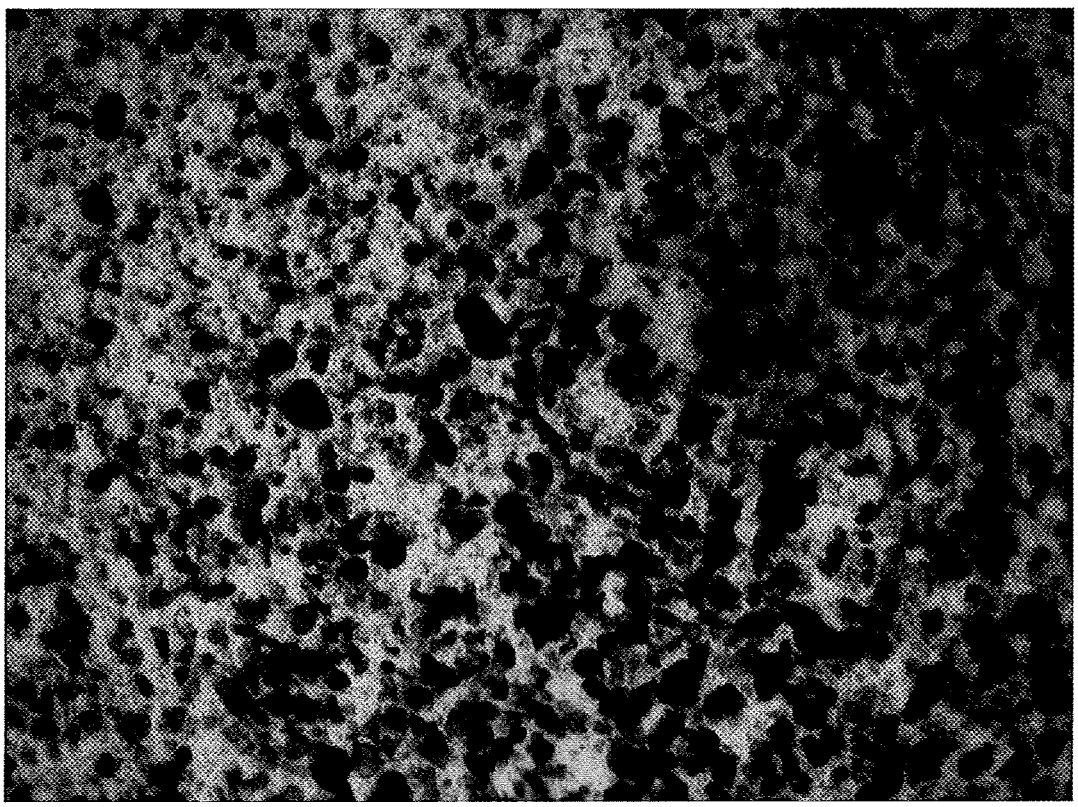
FIG. 26 depicts an optical micrograph of butyration of AL after 168 hours at 80× magnification.
Figure 27:
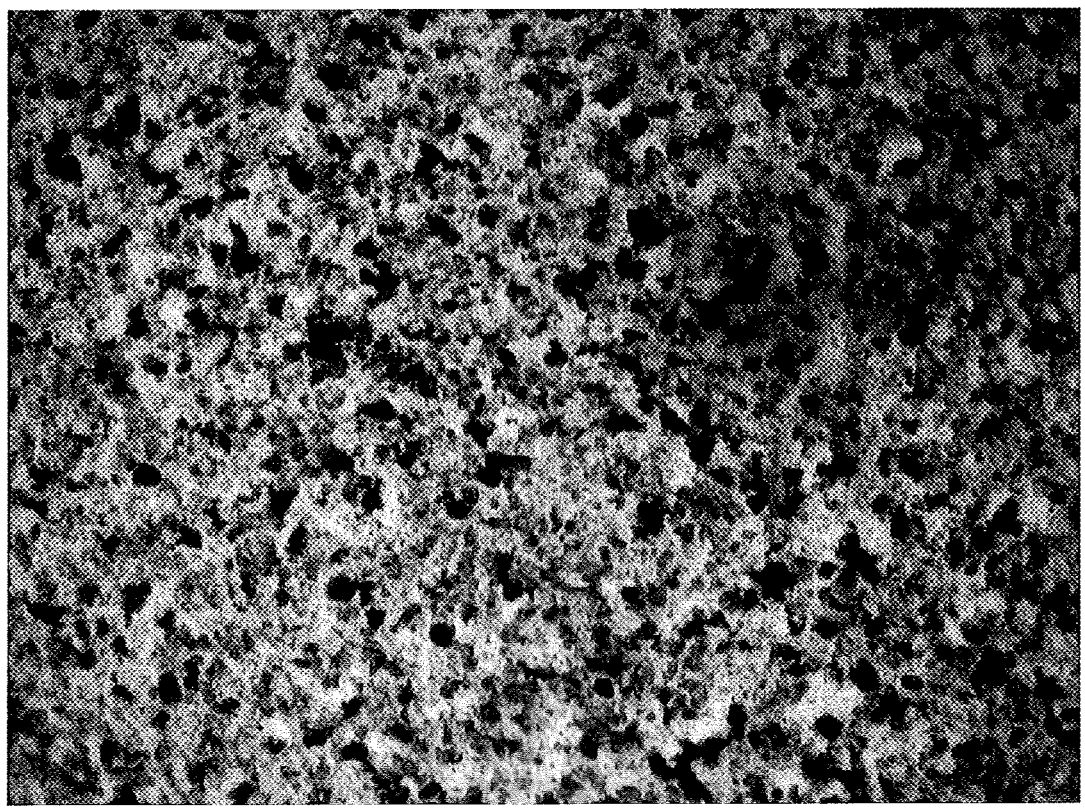
FIG. 27 depicts an optical micrograph of butyration of AL after 264 hours at 80× magnification.
Figure 28:
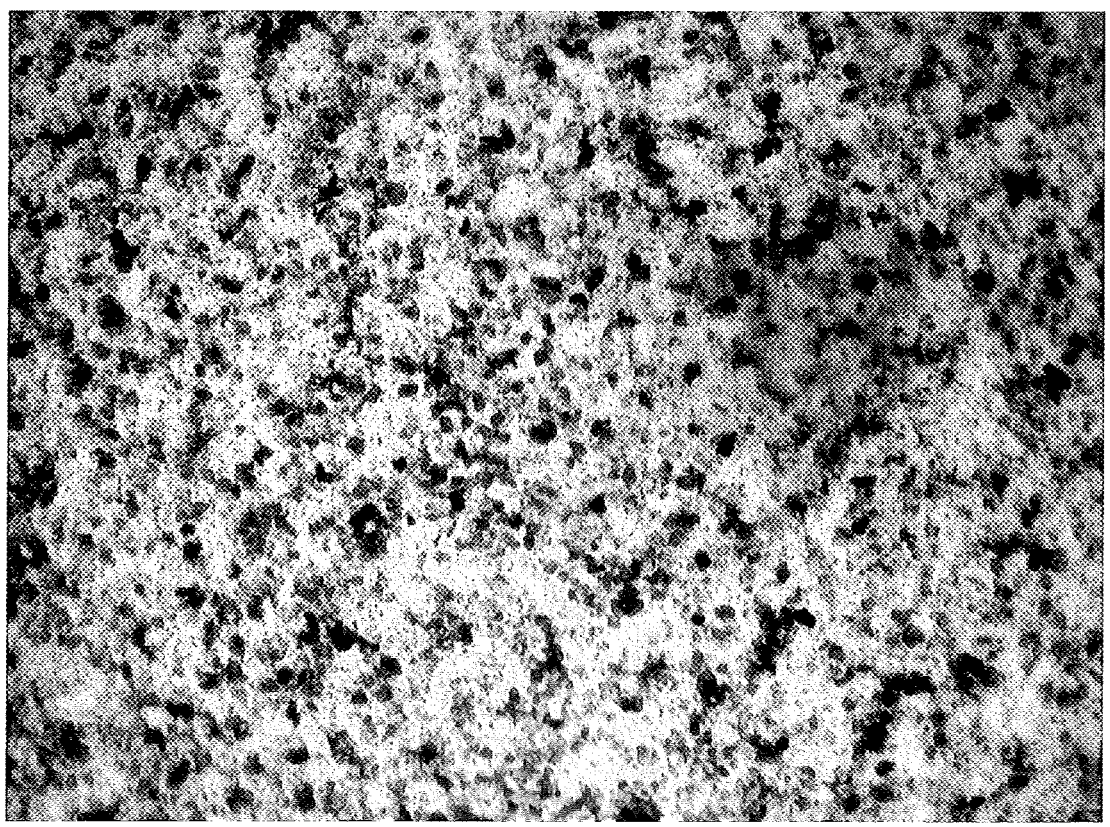
FIG. 28 depicts an optical micrograph of butyration of AL after 456 hours at 80× magnification.

After the lignins were dried, lignin butyration was completed. The samples were analyzed by FTIR to ensure the modification was complete. FIG. 21 illustrates the FTIR to ensure butyration was complete. The hydroxyl peak located at about 3450 $cm^{-1}$ was drastically reduced through the butyration reaction. The butyration of both the AL and the OL increased the lignin's hydrophobicity; thus, allowing for easier dispersion throughout hydrophobic solvents, such as toluene, as well as the lactide used for the solution polymerization. The butyration was considered complete based on optical microscopy pictures taken of the butyration reaction. Tiny samples of the butyration were removed at different times to ensure the reaction was complete before halting the reaction with di-ethyl ether. FIGS. 22-28 illustrate the butyration of AL over time. FIG. 22 illustrates butyration of AL after one hour at 80×. The average particle size was about 150 μm. FIG. 23 illustrates butyration of AL after six hours at 80×. The average particle size was about 70 μm. FIG. 24 illustrates butyration of AL after 72 hours at 80×. The average particle size was about 55 μm. FIG. 25 illustrates butyration of AL after 144 hours at 80×. The average particle size was about 40 μm. FIG. 26 illustrates butyration of AL after 168 hours at 80×. The average particle size was about 35 μm. FIG. 27 illustrates butyration of AL after 264 hours at 80×. The average particle size was about 30 μm. FIG. 28 illustrates butyration of AL after 456 hours at 80×. The average particle size was about 25 μm.

Once the native lignins were successfully butyrated, the solution polymerization reaction was completed. The resulting copolymers, the native lignins, and PLA homopolymer that was solution polymerized with the same procedure were all tested in a gas permeation chromatograph (GPC). Dilute solution viscometry was performed on the PLA homopolymer to confirm the weight average molecular weight determined via the GPC. Table 4 shows the number average molecular weight (Mn), the viscosity average molecular weight (Mv) and the weight average molecular weight (Mw) for PLA, OL, BO, SPBO-1%, SPBO-3% and SPBA-1% determined by dilute solution viscometry and GPC universal calibration method.

| Material | Sample Number | Mn | Mv | Mw |
|---|---|---|---|---|
| Dilute Solution | 1 | | 6.3E+01 | 5.5E+04 |
| Viscometry | 2 | | 5.9E+01 | 5.0E+04 |
| PLA | Average | | 6.1E+01 | 5.3E+04 |
| GPC | 1 | 3.4E+04 | | 6.0E+04 |
| (Universal) | 2 | 4.2E+04 | | 6.4E+04 |
| PLA | | | | |
| GPC | OL | 4.3E+02 | | 6.3E+02 |
| (Universal) - | BO | 5.1E+02 | | 2.6E+03 |
| Lignin | BA | 2.6E+03 | | 2.5E+04 |
| GPC | SPBO-1% | 1.5E+04 | | 3.3E+04 |

| Material | Sample Number | Mn | Mv | Mw |
|---|---|---|---|---|
| (Universal) - Grafted Copolymers | SPBO-3% SPBA-1% | 9.2E+02 2.1E+04 | | 3.4E+03 4.1E+04 |

The $M_w$ for the PLA homopolymer was about $6.0 \times 10^4 \pm 5 \times 10^3$; the average polydispersity index is found to be pdi=1.65. All of the grafted copolymers have lower $M_w$. This is a result of the relative abundance of initiating groups found on the lignins. Note that the highest number average molecular weight is found for the BO which is consistent with the idea that the BO sample has the fewest available hydroxyl initiating groups. In all cases, there are numerous PLA chains decorating the three dimensional lignin. The molecular weights for BA were skewed due to the BA not being 100% soluble in chloroform which is the solvent for the GPC. Thus, some of the BA was pre-filtered out in 0.2 μm filter used prior to injection into the GPC.

Figure 29:
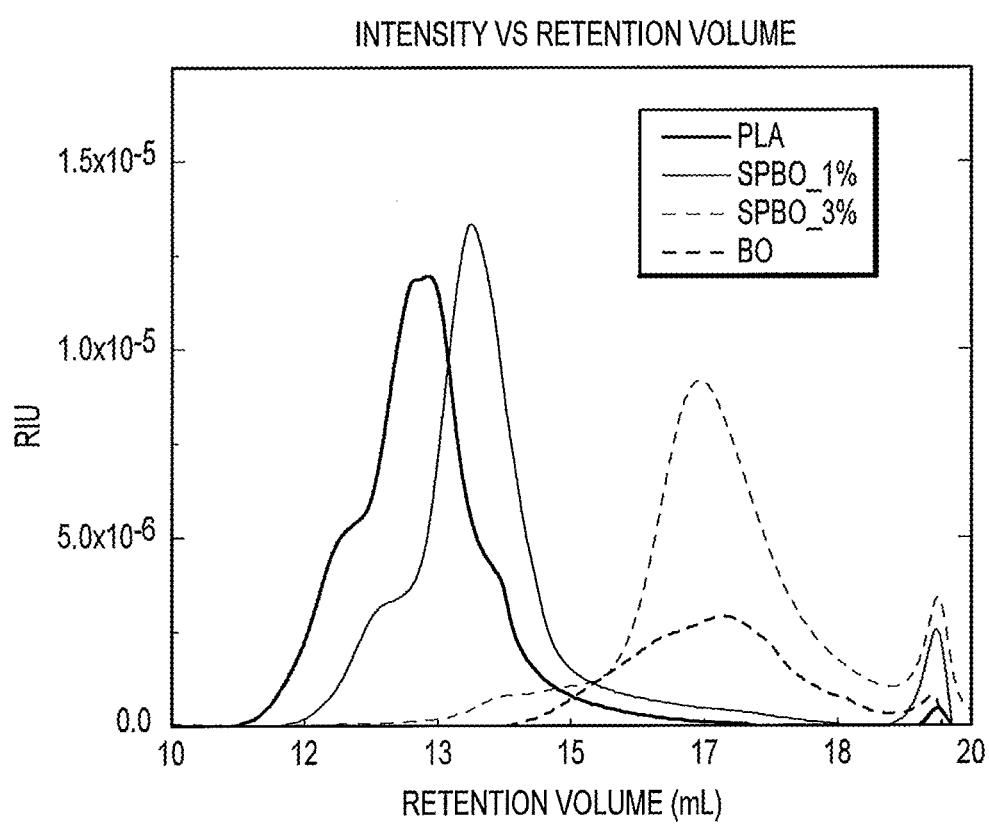
FIG. 29 depicts a GPC chromatogram illustrating intensity as a function of the retention volume for the solution polymerized butyrated organosolv lignin (SPBO-1%), solution polymerized butyrated organosolv lignin (SPBO-3%), and poly(lactic acid) butyrated organosolv lignin (BO)

FIG. 29 illustrates the intensity versus the retention volume produced from the GPC for the PLA homopolymer, SPBO-1%, SPBO-3%, and BO. The GPC clearly shows that the trend of the molecular weights was PLA>SPBO-1%>SPBO-3%>BO. This trend was expected seeing as the homopolymer should have the highest molecular weight followed by SPBO-1% in which PLA decorated the functionalized lignin. The SPBO-3% should be lower than the SPBO-1% seeing as with a higher amount of lignin in the 3%, more initiator sights for the polymerization of lactic acid exist. With a greater quantity of PLA chains polymerized from the SPBO-3%, the average molecular weights should be lower. As expected, the BO should be the lowest molecular weight considering no PLA is present in that sample.

Figure 30:
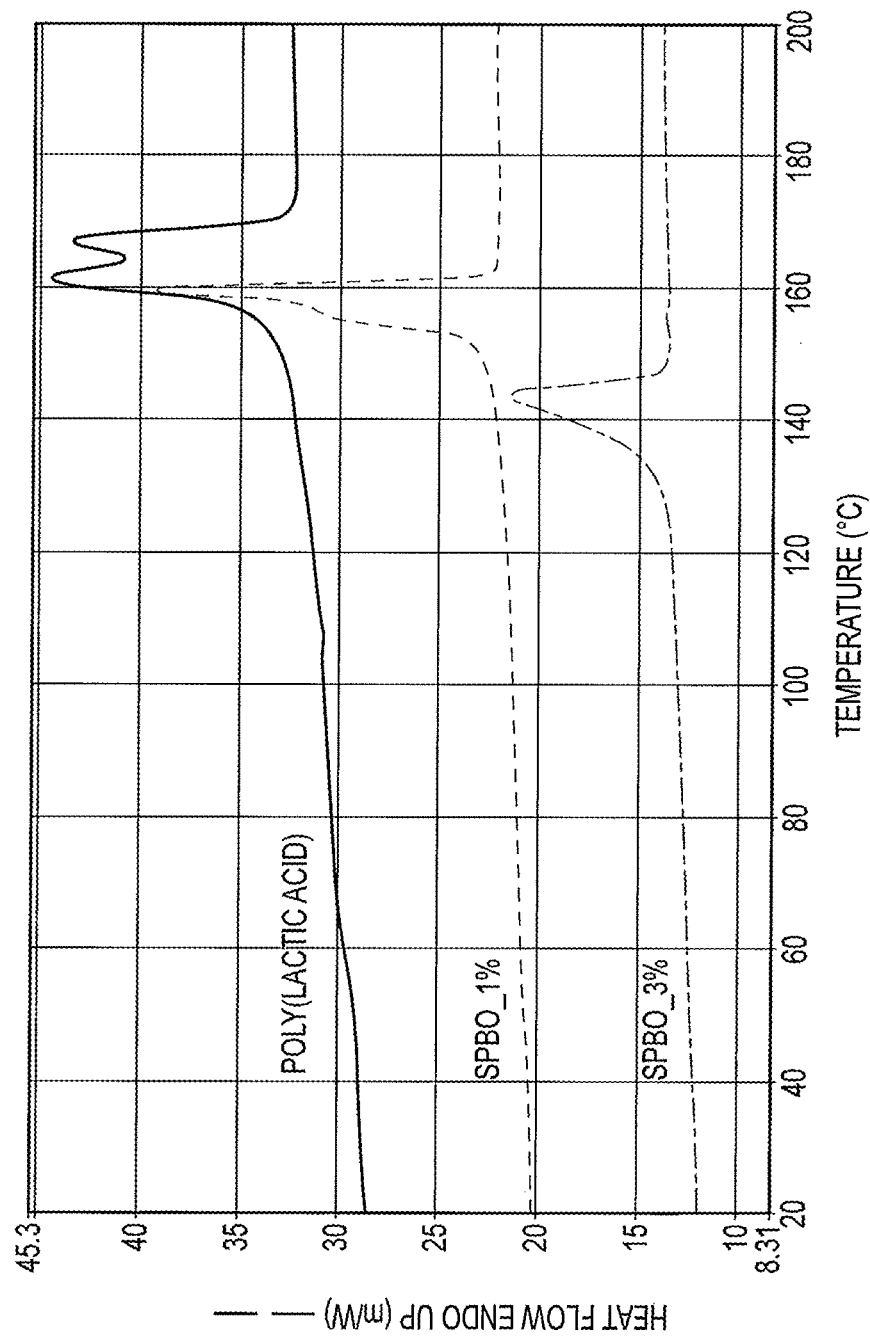
FIG. 30 depicts DSC curves for poly(lactic acid) (PLA), solution polymerized butyrated organosolv lignin (SPBO-1%) and solution polymerized butyrated organosolv lignin (SPBO-3%)

Samples of PLA, SPBO-1% and SPBO-3% were run in a DSC to determine their $T_g$, $T_n$, and percent crystallinity. FIG. 30 illustrates DSC curves for PLA, SPBO-1% and SPBO-3%. The Tg of the copolymer is a result of lignin's three dimensional shape. The PLA chains polymerized off of the lignin's many reactive sites forming more of a random star pattern outward instead of a linearly branched molecule. The Tg of the copolymer is decreased compared to the PLA due to the difficulty of the individual molecules to pack close together allowing for easier flow under a lower temperature.

Figure 31:
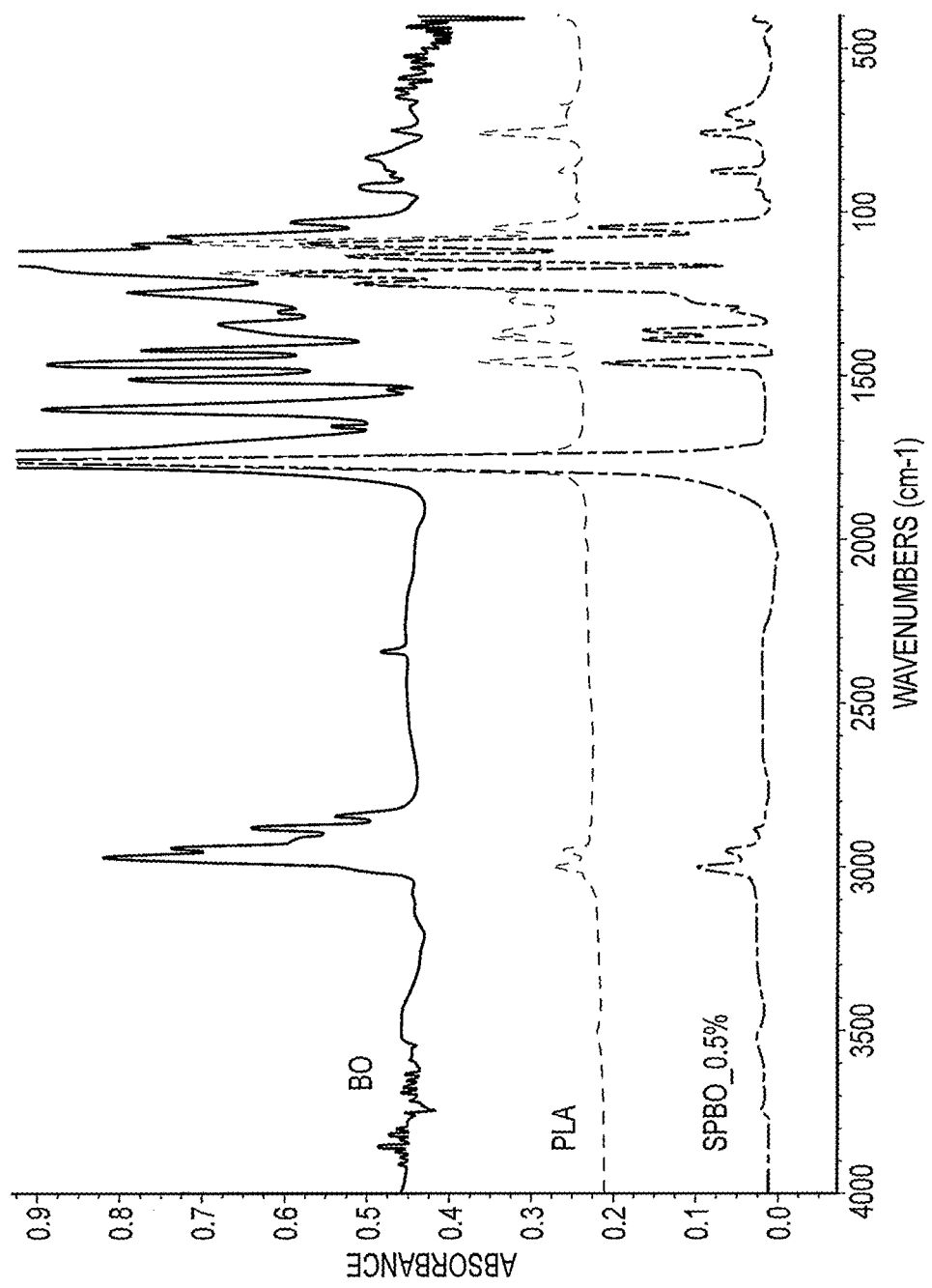
FIG. 31 depicts Fourier Transform Infrared spectrograms curves for solution polymerized Butyrated Organosolv Lignin (SPBO-0.5%), poly(lactic acid) (PLA) homopolymer, and poly(lactic acid) butyrated organosolv lignin (BO)
Figure 32:
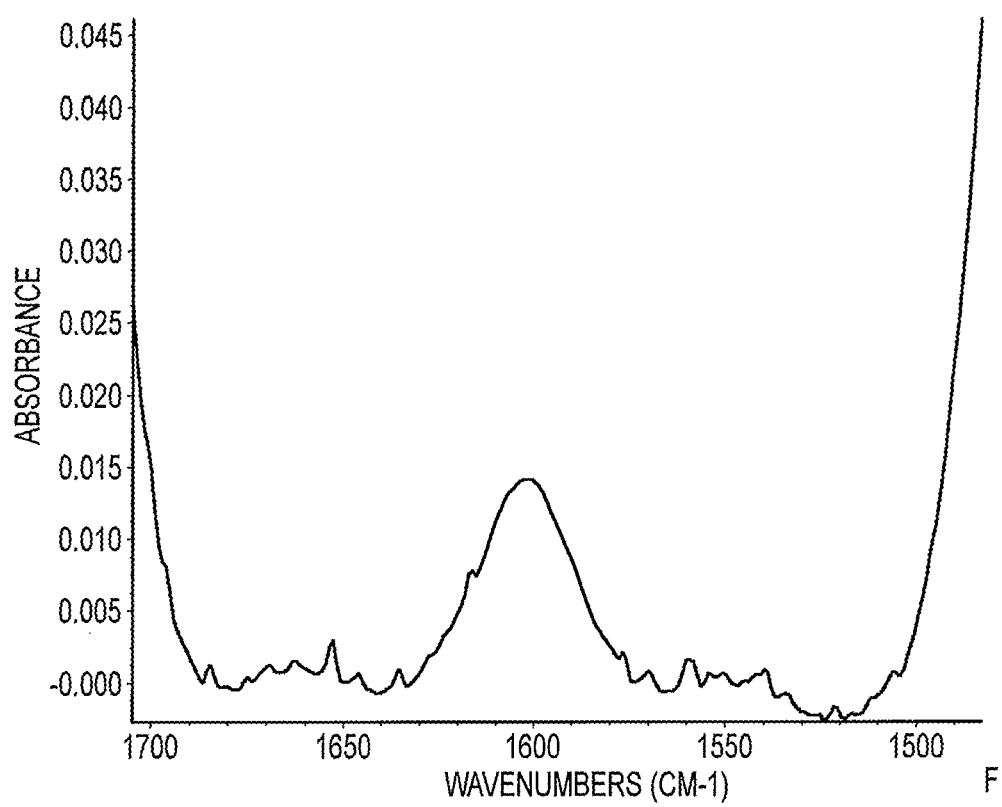
FIG. 32 depicts a portion of the Fourier Transform Infrared spectrogram of the poly(lactic acid) (PLA) homo-polymer of FIG. 31 over a range of wavenumbers.

FTIR analysis was completed on all of the synthesized copolymers. In FIG. 31, the FTIRs' of BO, PLA, and SPBO-0.5% are compared. The spectra for the copolymer did not explicitly show that lignin was present. This result was expected due to lignin's starting 0.5% weight percent. The spectra confirmed a strong amount of PLA was present in the copolymer. Upon magnification between 1500 $cm^{-1}$ and 1700 $cm^{-1}$, a small peak was seen in the spectra which reflected the stretching vibration of the carbon—carbon double bond. The C=C bond is absent in PLA implying that the peak is indicative of the C=C bonds present throughout lignin's aromatic structure. The magnified spectrum is illustrated in FIG. 32.

Figure 33:
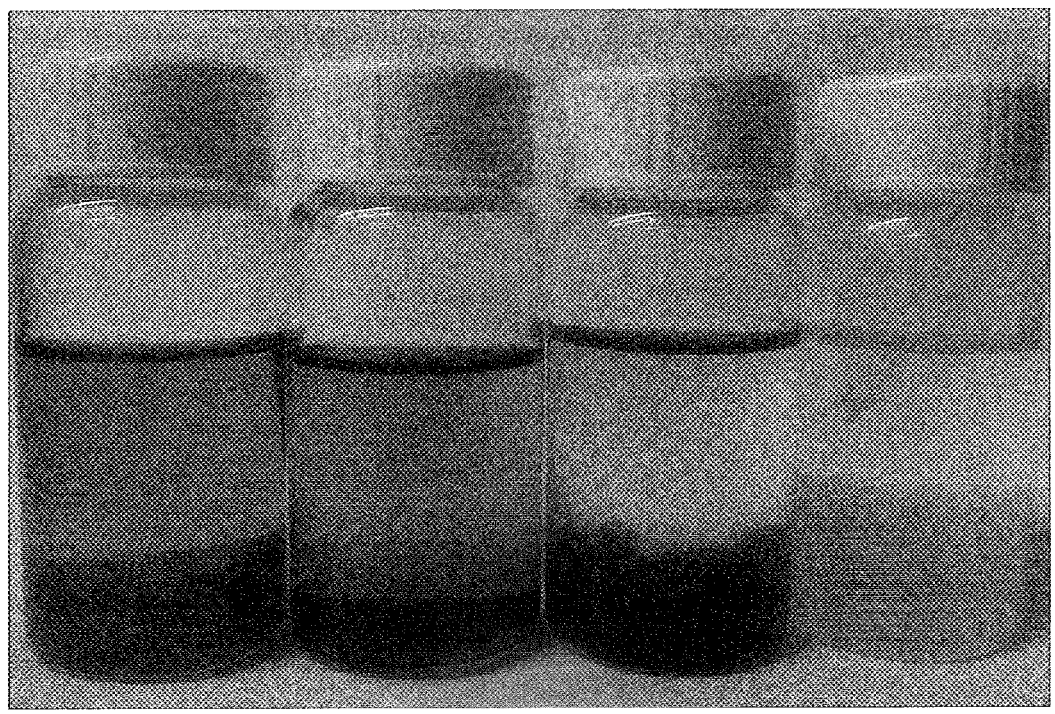
FIG. 33 depicts solubility in toluene; the four vials from left to right contain a physical mixture of poly(lactic acid) (PLA) homopolymer and butyrated organosolv lignin (BO) (left most vial), butyrated organosolv lignin (BO) (middle-left vial), poly(lactic acid) (PLA)-graft-lignin copolymer (middle-right vial), and poly(lactic acid) (PLA) homopolymer (right most vial).

A strong indication of the success of the grafting reaction is provided through solubility tests in toluene. Four solutions were prepared in small vials (from left to right): 1) a physical mixture of PLA homopolymer and BO, 2) BO, 3) PLA-graft-lignin copolymer, and 4) PLA homopolymer. Results of the solubility tests can be seen in FIG. 33. The left two vials of the photograph contain a mixture of PLA/BO and of BO alone. It is clear that the BO lignin is soluble in toluene as evidenced by the dark brown shade of these solutions (lignin is a dark brown color). In comparison, the PLA homopolymer is shown in the rightmost vial of FIG. 33; at room temperature PLA is insoluble in toluene and is seen to be on the bottom of the vial. The grafted material and PLA share a very similar hydrophilic nature—they are insoluble in toluene at room temperature. This insolubility is a result of the lignin being decorated with PLA chains held in place by covalent bonding.

The butyration of lignin proved to be a preferred, if not required step, in improving the PLA modification. The native lignins demonstrated that too many hydroxyl groups allow for an abundance of initiator sites for the PLA polymerization negatively impacting the molecular weight of the desired copolymer. Both functionally modified lignins, BA and BO, were successfully grafted with PLA. GPC, DSC, FTIR spectrum, and solubility tests proved that different lignins and PLA were successfully synthesized via solution polymerization to form a renewable PLA-graft-lignin copolymer for the first time. Although low molecular weight, the copolymer has potential to add value to the otherwise wasted lignin. These novel copolymers may find applications in resins, rubber reinforcers, panelboard adhesives, friction materials, and insulations.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

The invention claimed is:

1. A method to produce a polylactide-graft-lignin blend, the method comprising:
   butyrate a lignin to produce a butyrated lignin;
   heating a polylactic acid to a temperature between about 160° C. to about 190° C.; and
   mixing the heated polylactic acid with the butyrated lignin to produce a polylactide-graft-lignin blend.

2. The method of claim 1, further comprising cooling the polylactide-graft-lignin blend to produce a cooled polylactide-graft-lignin blend.

3. The method of claim 1, further comprising adding a stabilizer solution to the heated polylactic acid before mixing the heated polylactic acid with the butyrated lignin.

4. The method of claim 1, wherein the butyrated lignin is between about 0.5 wt. % to about 40 wt. % of a mixture with the polylactic acid.

5. The method of claim 1, wherein the method for butyration of a lignin comprising:
   drying the lignins;
   mixing the lignin in butyric anhydride for between about 96 hours to about 264 hours to produce a butyrated lignin;
   isolating the butyrated lignin; and
   washing the butyrated lignin.

6. The method of claim 5, wherein the lignins are dried at between about 100° C. and about 150° C.

7. The method of claim 5, wherein the lignins are dried at about 125° C.

8. The method of claim 6, wherein the lignins are dried for between about 12 hours to about 48 hours.

9. The method of claim 6, wherein the lignins are dried for about 24 hours.

10. The method of claim 5, wherein the lignins are reacted in the butyric anhydride at between about 30° C. and about 75° C. under vigorous agitation.

11. The method of claim 5, wherein the lignin is reacted in the butyric anhydride at about 50° C. under vigorous agitation.

12. The method of claim 5, wherein the lignin is selected from the group consisting of alkali lignin and organosolv lignin.

13. The method of claim 5, wherein the lignin is reacted in the butyric anhydride and purged with an inert gas, wherein the inert gas is selected from the group consisting of nitrogen, argon, and helium.

14. The method of claim 1, wherein the mixing occurs at a temperature between about 160° C. and about 190° C.

15. The method of claim 2, further comprising granulating the cooled polylactide-graft-lignin blend.

16. The method of claim 1, further comprising adding a catalyst in the mixing step.

17. The method of claim 1, wherein the weight percentage of the butyrated lignin in the heated polylactic acid is between about 0.5 wt. % and about 20 wt %.

18. The method of claim 1, wherein the mixing step occurs at a temperature between about 120° C. and about 180° C.

19. The method of claim 18, wherein a temperature ramp to reach the temperature of the mixing step occurs over a time between about 30 minutes to about 1.5 hours.

20. The method of claim 18, wherein after the temperature is reached, a pressure is reduced to between about 30 torr and about 70 torr.

\* \* \* \* \*